United States Patent
Wang

(10) Patent No.: US 12,148,439 B2
(45) Date of Patent: Nov. 19, 2024

(54) METHOD FOR AUTOMATICALLY SWITCHING BLUETOOTH AUDIO CODING SCHEME AND ELECTRONIC DEVICE

(71) Applicant: Huawei Technologies Co., Ltd., Shenzhen (CN)

(72) Inventor: Liang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 721 days.

(21) Appl. No.: 17/418,569

(22) PCT Filed: Dec. 27, 2018

(86) PCT No.: PCT/CN2018/124497
§ 371 (c)(1),
(2) Date: Jan. 25, 2022

(87) PCT Pub. No.: WO2020/133112
PCT Pub. Date: Jul. 2, 2020

(65) Prior Publication Data
US 2022/0148608 A1 May 12, 2022

(51) Int. Cl.
*H04W 4/80* (2018.01)
*G10L 19/16* (2013.01)
(Continued)

(52) U.S. Cl.
CPC ............ *G10L 19/24* (2013.01); *G10L 19/167* (2013.01); *G10L 19/22* (2013.01); *H04W 4/80* (2018.02)

(58) Field of Classification Search
CPC ....... G10L 19/24; G10L 19/167; G10L 19/22; H04W 4/80; H04M 2250/02;
(Continued)

(56) References Cited

U.S. PATENT DOCUMENTS 7,058,078 B2 * 6/2006 Kikuchi ................. H04N 7/141
375/E7.017
7,787,529 B2 8/2010 Cheng et al.
(Continued)

FOREIGN PATENT DOCUMENTS

CN 108093197 A 5/2018
CN 108737658 A 11/2018
(Continued)

*Primary Examiner* — Andrew Wendell
(74) *Attorney, Agent, or Firm* — Conley Rose, P.C.

(57) ABSTRACT

Embodiments of this application relate to the field of short-range communications technologies, and provide a method for automatically switching a Bluetooth audio coding scheme and an electronic device, to improve audio experience of using a Bluetooth electronic device by a user, and meet requirements of the user on sound quality and a latency. A specific solution is as follows: When a first device sends a Bluetooth audio data packet to a second device, and when a first application is running, the audio data packet sent by the first device to the second device is encoded by using a first Bluetooth coding scheme. When a second application is running, the audio data packet sent by the first device to the second device is encoded by using a second Bluetooth coding scheme. The Bluetooth coding scheme includes a high sound quality mode, a standard mode, or a low latency mode. The first Bluetooth coding scheme is different from the second Bluetooth coding scheme.

20 Claims, 14 Drawing Sheets

(51) Int. Cl.
*G10L 19/22* (2013.01)
*G10L 19/24* (2013.01)
*H04M 1/72412* (2021.01)

(58) Field of Classification Search
CPC ........... H04M 1/6066; H04M 1/72412; H04M 1/6041; H04M 1/6058
See application file for complete search history.

(56) References Cited

U.S. PATENT DOCUMENTS

| | | | |
|---|---|---|---|
| 10,130,891 B2* | 11/2018 | Perlman | H04N 21/2143 |
| 10,475,456 B1* | 11/2019 | Bhatia | G10L 19/005 |
| 11,600,283 B2* | 3/2023 | Dietz | G10L 19/18 |
| 2004/0094020 A1* | 5/2004 | Wang | G10H 1/361 |
| | | | 84/622 |
| 2007/0232255 A1 | 10/2007 | Masuda | |
| 2009/0192803 A1* | 7/2009 | Nagaraja | G10L 19/012 |
| | | | 704/278 |
| 2010/0083344 A1* | 4/2010 | Schildbach | G10L 19/173 |
| | | | 704/E21.001 |
| 2010/0191536 A1* | 7/2010 | Sampat | H04R 1/1083 |
| | | | 704/500 |
| 2011/0051635 A1* | 3/2011 | Yang | H04L 27/22 |
| | | | 370/310 |
| 2011/0274156 A1 | 11/2011 | Mighani et al. | |
| 2012/0117620 A1* | 5/2012 | Cassidy | H04N 21/2543 |
| | | | 726/3 |
| 2013/0331032 A1* | 12/2013 | Kumar | H04M 1/72412 |
| | | | 455/41.2 |
| 2015/0154370 A1 | 6/2015 | Skaaksrud | |
| 2018/0336907 A1* | 11/2018 | Atti | G10L 19/008 |

FOREIGN PATENT DOCUMENTS

| | | |
|---|---|---|
| CN | 108988909 A | 12/2018 |
| CN | 109003618 A | 12/2018 |

* cited by examiner

METHOD FOR AUTOMATICALLY SWITCHING BLUETOOTH AUDIO CODING SCHEME AND ELECTRONIC DEVICE

CROSS-REFERENCE TO RELATED APPLICATIONS

This application is a national stage of International Patent Application No. PCT/CN2018/124497 filed on Dec. 27, 2018, which is hereby incorporated by reference in its entirety.

TECHNICAL FIELD

This application relates to the field of short-range communications technologies, and in particular, to a method for automatically switching a Bluetooth audio coding scheme and an electronic device.

BACKGROUND

With continuous development of Bluetooth (Bluetooth) technologies, electronic devices having a Bluetooth connection function are widely used. For example, Bluetooth headsets are more commonly used with the elimination of the 3.5 mm headset jack on mobile phones. However, due to a limitation of an air interface transmission rate, Bluetooth audio cannot well balance sound quality and a latency, and the Bluetooth headset cannot achieve the same audio experience as a high-quality wired headset. A problem that needs to be resolved is how to improve audio experience of using a Bluetooth electronic device by a user and meet requirements of the user on sound quality and a latency.

SUMMARY

This application provides a method for automatically switching a Bluetooth audio coding scheme and an electronic device, to improve audio experience of using a Bluetooth electronic device by a user, and meet requirements of the user on sound quality and a latency.

According to a first aspect, an embodiment of this application provides a method for automatically switching a Bluetooth audio coding scheme. The method may include the following steps.

When a first application is running, a first Bluetooth coding scheme is used to encode an audio data packet that is of the first application and that is sent by a first device to a second device. When a second application is running, a second Bluetooth coding scheme is used to encode an audio data packet that is of the second application and that is sent by the first device to the second device. The first Bluetooth coding scheme is different from the second Bluetooth coding scheme.

In this method, for different applications, different Bluetooth coding schemes are used for encoding, so that for audio data packets of different applications, coding bit rates are different, and requirements of high sound quality or a low latency can be met for different applications.

With reference to the first aspect, in a possible design manner, the Bluetooth coding scheme includes a high sound quality mode, a standard mode, or a low latency mode. The high sound quality mode includes at least one of LDAC, aptX HD, and HWA. The standard mode includes at least one of sub-band coding SBC, advanced audio coding AAC, and aptX. The low latency mode includes at least one of HWA LL and aptX LL.

In this method, different Bluetooth coding schemes are implemented by different Bluetooth audio codecs.

With reference to the first aspect, in a possible design manner, the first Bluetooth coding scheme and the second Bluetooth coding scheme respectively correspond to different bit rate modes of a Bluetooth audio codec. The Bluetooth audio codec is one of LDAC, aptX HD, HWA, sub-band coding SBC, advanced audio coding AAC, aptX, HWA LL, and aptX LL.

In this method, different Bluetooth coding schemes are implemented by different bit rate modes of a Bluetooth audio codec.

With reference to the first aspect, in a possible design manner, the first application belongs to a first application category, and the second application belongs to a second application category. The first device determines, based on the first application category, that the audio data packet of the first application is to be encoded by using the first Bluetooth coding scheme, and the first device determines, based on the second application category, that the audio data packet of the second application is to be encoded by using the second Bluetooth coding scheme. The first application category is different from the second application category. In a possible design manner, the application category includes music playback, a video, a real-time game, music interaction, or a call.

With reference to the first aspect, in a possible design manner, that the first device determines, based on the first application category, that the audio data packet of the first application is to be encoded by using the first Bluetooth coding scheme, and the first device determines, based on the second application category, that the audio data packet of the second application is to be encoded by using the second Bluetooth coding scheme specifically includes: The first device determines that the first application belongs to local music playback, and therefore determines that the audio data packet of the first application is to be encoded in the high sound quality mode; and the first device determines that the second application belongs to a real-time game, and therefore determines that the audio data packet of the second application is to be encoded in the low latency mode.

With reference to the first aspect, in a possible design manner, a third application belongs to a third application category. When the third application is in a first network state, the first device determines that an audio data packet of the third application is to be encoded by using a third Bluetooth coding scheme. When the third application is in a second network state, the first device determines that the audio data packet of the third application is to be encoded by using a fourth Bluetooth coding scheme. The network state includes a Wi-Fi state, a cellular state, or a local state. The first network state is different from the second network state, and the third Bluetooth coding scheme is different from the fourth Bluetooth coding scheme.

In this implementation, if Bluetooth and Wi-Fi share resources, a non-high sound quality mode is used for a Bluetooth audio data packet, so that a necessary transmission resource can be freed for Wi-Fi transmission, thereby ensuring that the audio data packet is successfully downloaded from a network side.

With reference to the first aspect, in a possible design manner, the third application belongs to a video. When the third application is in the Wi-Fi state, the first device determines that the audio data packet of the third application is to be encoded in the standard mode. When the third application is in the local state, the first device determines that the audio data packet of the third application is to be encoded in the high sound quality mode.

With reference to the first aspect, in a possible design manner, when a link status change is detected, a fifth Bluetooth coding scheme is used to encode the audio data packet that is of the first application and that is sent by the first device to the second device. The fifth Bluetooth coding scheme is different from the first Bluetooth coding scheme. In this way, in a running process of the application, the Bluetooth coding scheme can be adjusted in time based on a link status.

With reference to the first aspect, m a possible design manner, when the first application is running, the standard mode is used to encode the audio data packet that is of the first application and that is sent by the first device to the second device. If it is detected that a latency of playing audio data of the first application is less than a specified threshold, the high sound quality mode is used to encode the audio data packet that is of the first application and that is sent by the first device to the second device.

With reference to the first aspect, in a possible design manner, the first device sends first indication information to the second device, where the first indication information is used to indicate a Bluetooth coding scheme corresponding to an audio data packet of an application. In this way, a playback side can perform decoding by using a Bluetooth decoding scheme corresponding to a Bluetooth coding scheme of a source side, to successfully play audio.

According to a second aspect, an embodiment of this application provides an electronic device. The electronic device can implement the method for automatically switching a Bluetooth audio coding scheme according to the first aspect. The electronic device may be an electronic device having a Bluetooth connection function. For example, the electronic device may be a terminal or a chip applied to the terminal, or may be another electronic device that can implement the foregoing method for automatically switching a Bluetooth audio coding scheme, and may implement the foregoing method by using software, hardware, or by hardware executing corresponding software.

In a possible design, the electronic device may include a processor and a memory. The processor is configured to support the electronic device in performing a corresponding function in the method in the first aspect. The memory is configured to be coupled to the processor, and stores a program instruction and data that are necessary for the electronic device. In addition, the electronic device may further include a communications interface, configured to support communication between the electronic device and another electronic device. The communications interface may be a transceiver or a transceiver circuit.

According to a third aspect, an embodiment of this application provides a computer storage medium. The computer storage medium includes a computer instruction, and when the computer instruction runs on an electronic device, the electronic device performs the method for automatically switching a Bluetooth audio coding scheme according to the first aspect and the possible design manners of the first aspect.

According to a fourth aspect, an embodiment of this application provides a computer program product. When the computer program product runs on a computer, the computer performs the method for automatically switching a Bluetooth audio coding scheme according to the first aspect and the possible design manners of the first aspect.

For technical effects brought by the electronic device according to the second aspect, the computer storage medium according to the third aspect, and the computer program product according to the fourth aspect, refer to the technical effects brought by the first aspect and different design manners of the first aspect. Details are not described herein again.

BRIEF DESCRIPTION OF DRAWINGS

FIG. 2-1 is a schematic diagram 2 of a system framework to which a method for automatically switching a Bluetooth audio coding scheme is applicable according to an embodiment of this application;

FIG. 2-2 is a schematic diagram 3 of a system framework to which a method for automatically switching a Bluetooth audio coding scheme is applicable according to an embodiment of this application;

FIG. 2-3 is a schematic diagram 4 of a system framework to which a method for automatically switching a Bluetooth audio coding scheme is applicable according to an embodiment of this application;

FIG. 2-4 is a schematic diagram 5 of a system framework to which a method for automatically switching a Bluetooth audio coding scheme is applicable according to an embodiment of this application;

FIG. 3 is a schematic structural diagram of an electronic device to which a method for automatically switching a Bluetooth audio coding scheme is applicable according to an embodiment of this application;

FIG. 3-1 is a schematic structural diagram 2 of an electronic device to which a method for automatically switching a Bluetooth audio coding scheme is applicable according to an embodiment of this application;

FIG. 4 is a schematic structural diagram of an earbud to which a method for automatically switching a Bluetooth audio coding scheme is applicable according to an embodiment of this application;

DESCRIPTION OF EMBODIMENTS

Figure 1:
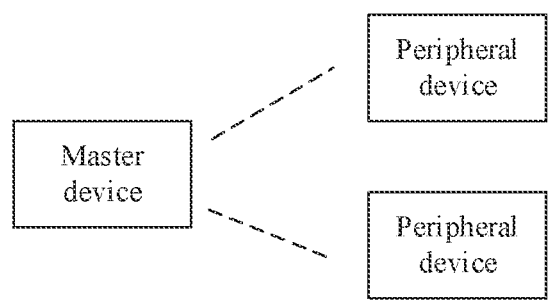
FIG. 1 is a schematic diagram of a system framework to which a method for automatically switching a Bluetooth audio coding scheme is applicable according to an embodiment of this application.

A method for automatically switching a Bluetooth audio coding scheme provided in an embodiment of this application may be applied to a system shown in FIG. 1. As shown in FIG. 1, the system may include a master device and one or more peripheral devices (two peripheral devices are used as an example in FIG. 1). The master device and the peripheral devices may communicate with each other in a Bluetooth mode. Optionally, the peripheral devices may also communicate with each other in the Bluetooth mode. The master device or the peripheral device may be an electronic device having a Bluetooth connection function. The electronic device may include a smartphone, a high sound quality headset, a notebook computer, a tablet computer, a media player, a smartwatch, a robotic system, a handheld device, a gamepad, a virtual reality (virtual reality, VR) device, an augmented reality (augmented reality, AR) device, a vehicle-mounted device, a smart wearable device, a modem, a smart appliance, or the like.

Figures 1, 2:
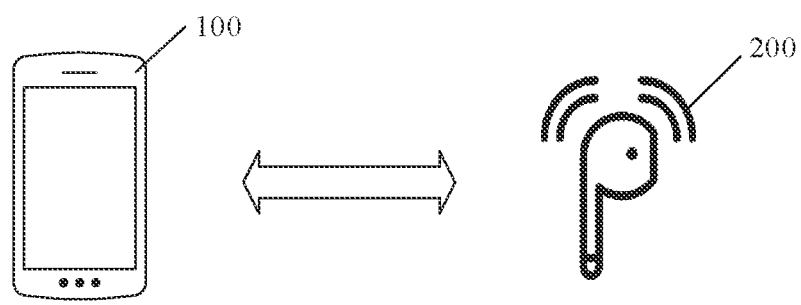
Figure 2:
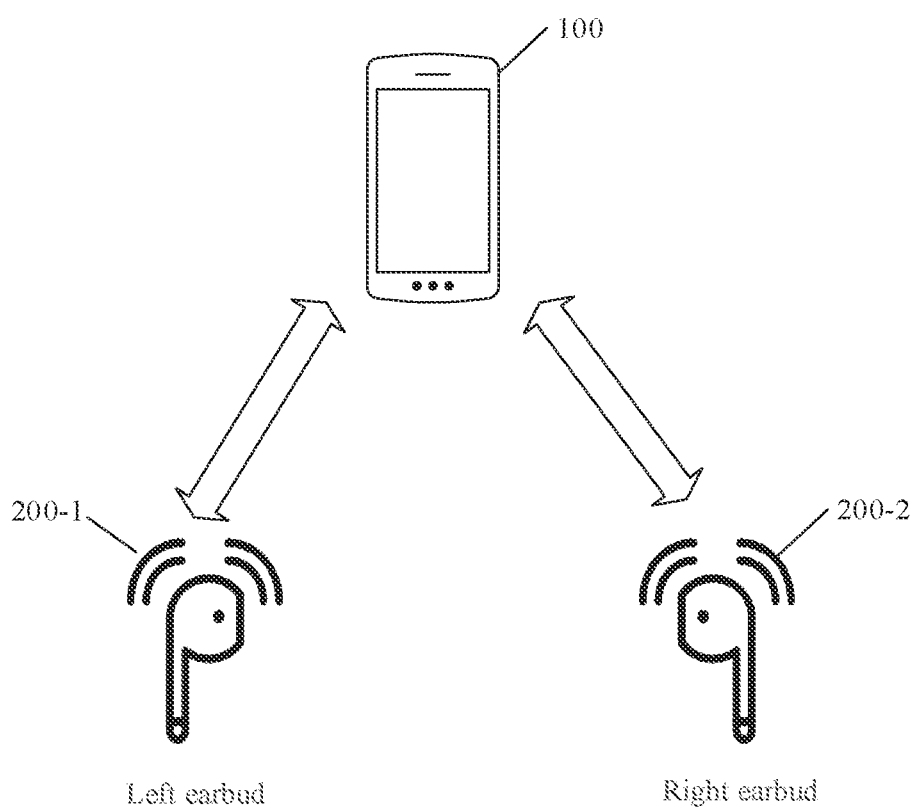
Figures 2, 3:
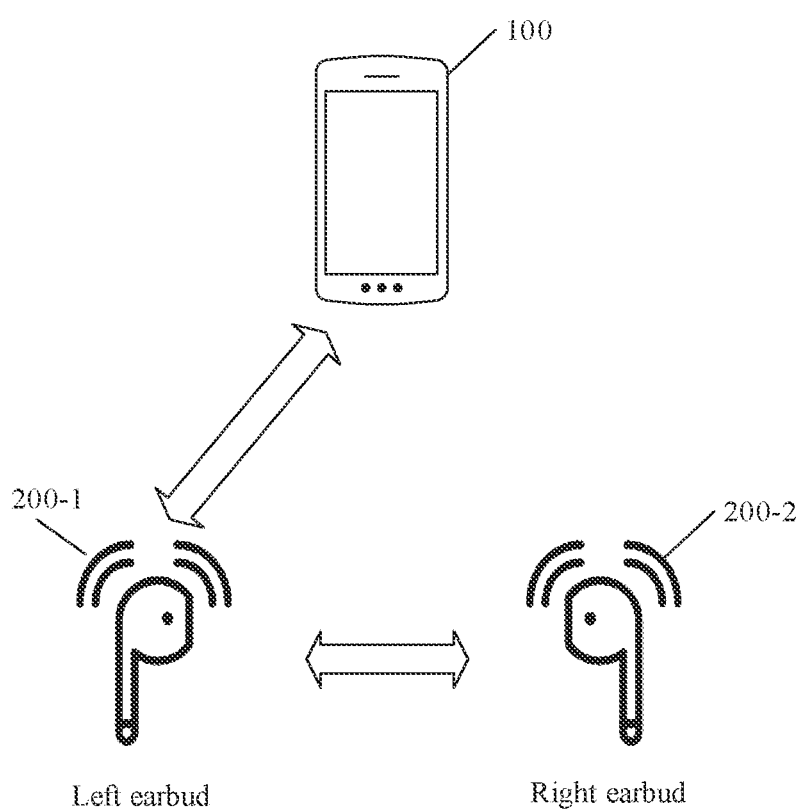
Figures 2, 3, 4:
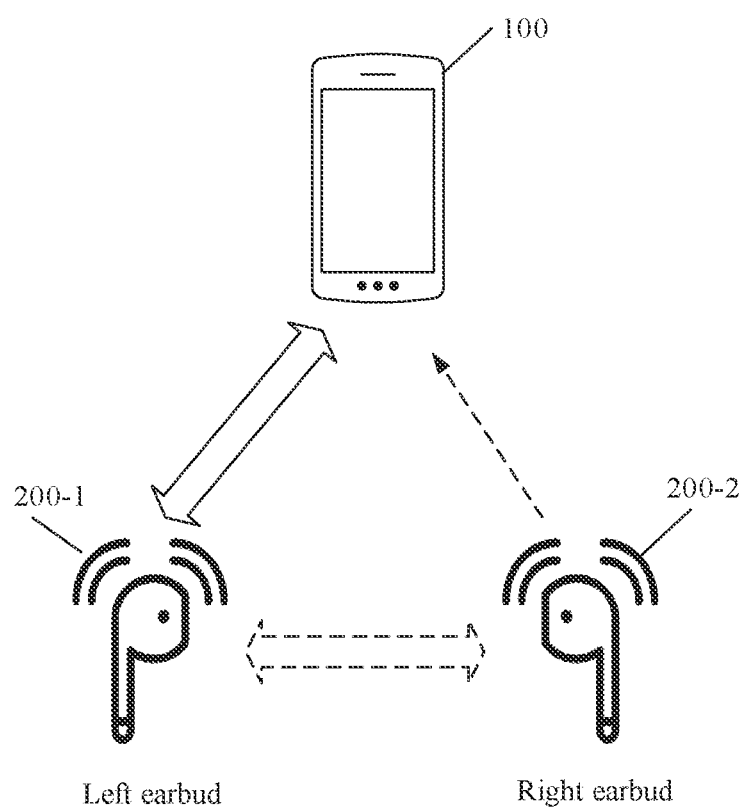
Figure 3:
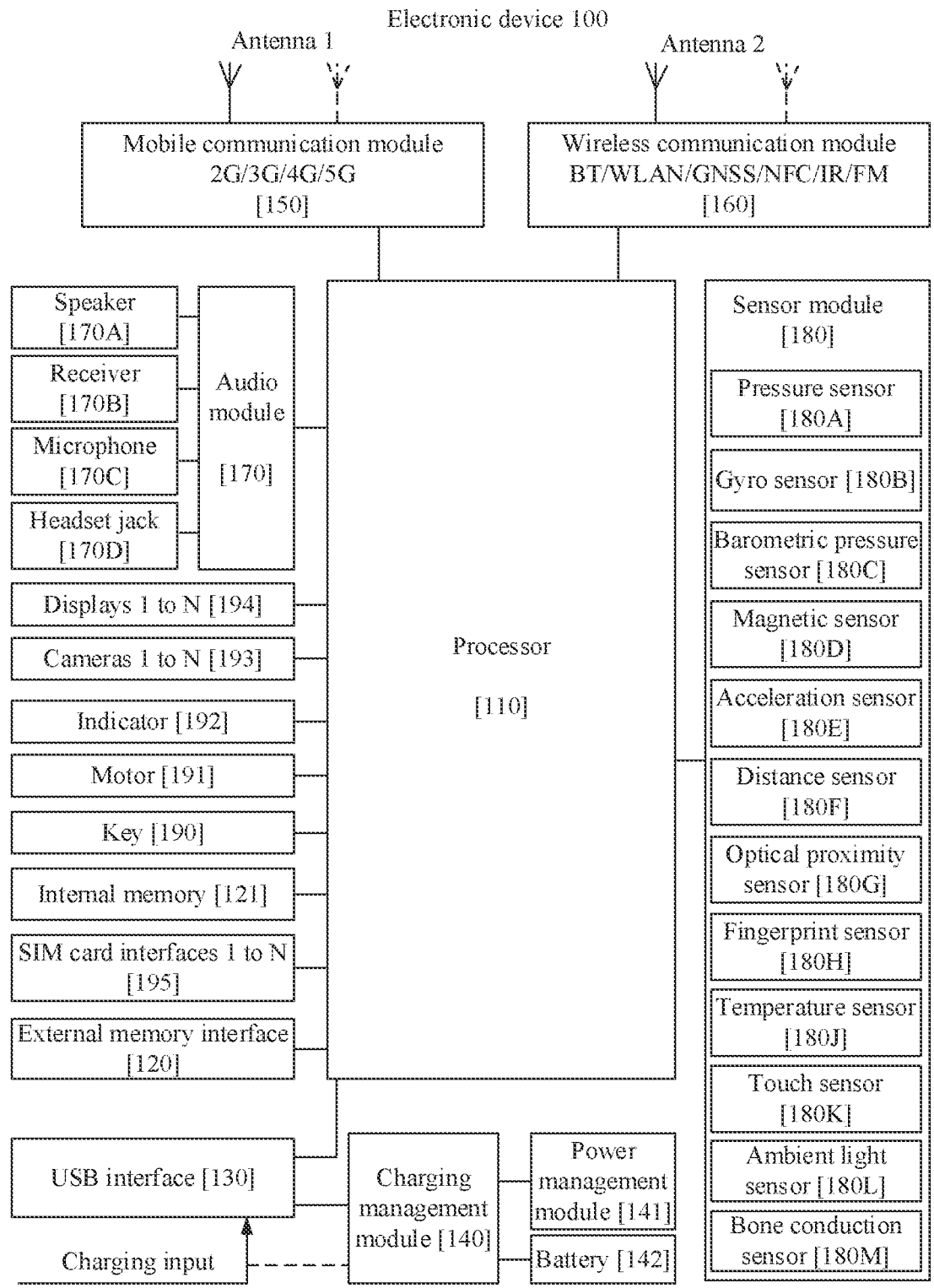
Figures 1, 3:
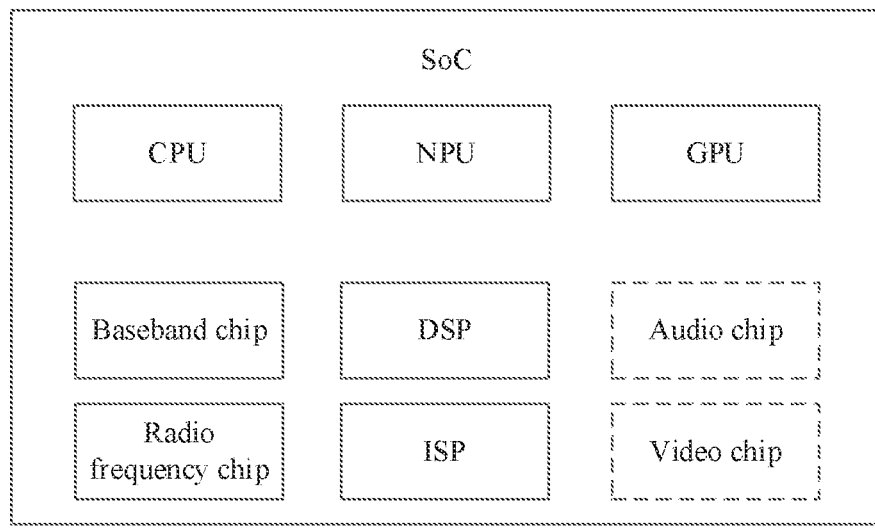
Figure 4:
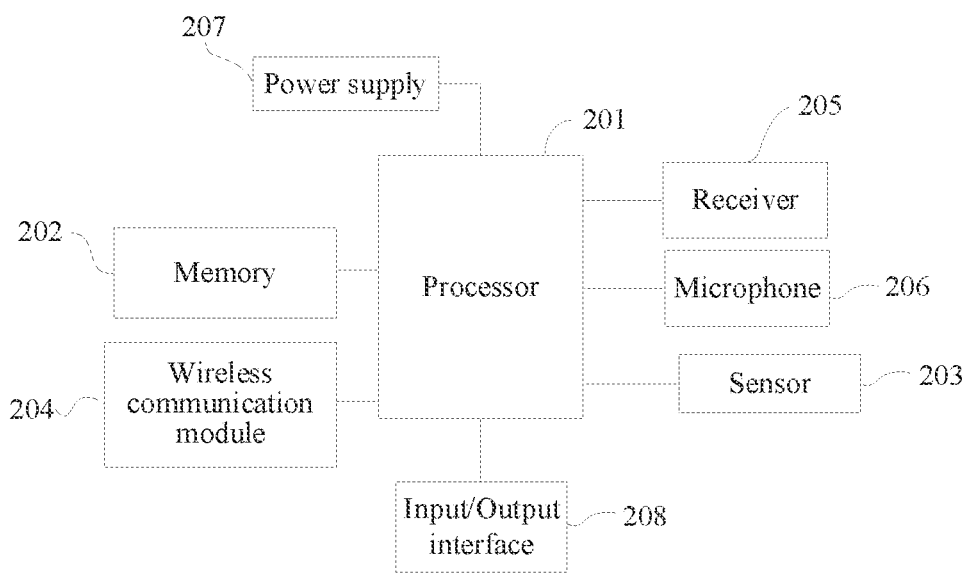

In an example, the system in FIG. 1 may be in a form shown in FIG. 2-1, and the system includes an electronic device 100 and an earbud 200. The electronic device 100 is a master device, the earbud 200 is a peripheral device, and the electronic device 100 and the earbud 200 are paired and connected by Bluetooth. Alternatively, the system in FIG. 1 may be in a form shown in FIG. 2-2, FIG. 2-3, or FIG. 2-4. The system includes an electronic device 100, a left earbud 200-1, and a right earbud 200-2. The electronic device 100 is a master device. The left earbud 200-1 and the right earbud 200-2 are peripheral devices. As shown in FIG. 2-2, the left earbud 200-1 and the right earbud 200-2 are paired and connected by Bluetooth, and the left earbud 200-1 and the right earbud 200-2 are separately paired with and connected to the electronic device 100 by Bluetooth. The left earbud 200-1 and the right earbud 200-2 can separately perform control information exchange and data communication with the electronic device 100. As shown in FIG. 2-3, the left earbud 200-1 is a primary earbud, is paired with and connected to the electronic device 100 by Bluetooth, and can directly perform control information exchange and data communication with the electronic device 100. The right earbud 200-2 is a secondary earbud, is paired with and connected to the left earbud 200-1 by Bluetooth, and can perform control information exchange and data communication with the electronic device 100 by using the left earbud 200-1. As shown in FIG. 2-4, the left earbud 200-1 is a primary earbud, is paired with and connected to the electronic device 100 by Bluetooth, and can directly perform control information exchange and data communication with the electronic device 100. The right earbud 200-2 is a secondary earbud, and is paired with and connected to the left earbud 200-1 by Bluetooth. The right earbud 200-2 can perform control signaling interworking with the left earbud 200-1, to obtain a connection parameter between the left earbud 200-1 and the electronic device 100, and monitor data communication between the left earbud 200-1 and the electronic device 100 based on the connection parameter.

The electronic device 100 may be a smartphone, a tablet computer, a notebook computer, a media player, a vehicle-mounted device, or the like that has a Bluetooth connection capability. The earbud 200, the left earbud 200-1, or the right earbud 200-2 may be an earbud of a wireless Bluetooth headset having the Bluetooth connection capability.

FIG. 3 is a schematic structural diagram of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention constitutes no specific limitation on the electronic device 100. In some other embodiments of this application, the electronic device 100 may include more or fewer components than those shown in the figure, or combine some components, or split some components, or have different component arrangements. The illustrated components may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to control instruction fetching and instruction execution.

A memory may be further disposed in the processor 110, and is configured to store an instruction and data. In some embodiments, the memory in the processor 110 is a cache. The memory may store an instruction or data that is used or cyclically used by the processor 110. If the processor 110 needs to use the instruction or the data again, the instruction or the data may be invoked directly from the memory. This avoids repeated access and reduces a waiting time of the processor 110, thereby improving efficiency of the system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus that includes a serial data line (serial data line, SDA) and a serial clock line (serial clock line, SCL). In some embodiments, the processor 110 may include a plurality of I2C buses. The processor 110 may be separately coupled to the touch sensor 180K, a charger, a flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of I2S buses. The processor 110 may be coupled to the audio module 170 by using an I2S bus, to implement communication between the processor 110 and the audio module 170. In some embodiments, the audio module 170 may transmit an audio signal to the wireless communication module 160 by using the I2S interface, to implement a function of answering a call by using a Bluetooth headset.

The PCM interface may also be used for audio communication to sample, quantize, and encode an analog signal. In some embodiments, the audio module 170 and the wireless communication module 160 may be coupled by using a PCM bus interface. In some embodiments, the audio module 170 may alternatively transmit an audio signal to the wireless communication module 160 by using the PCM interface, to implement a function of answering a call by using a Bluetooth headset. Both the I2S interface and the PCM interface may be used for audio communication.

The UART interface is a universal serial data bus used for asynchronous communication. The bus may be a bidirectional communications bus. The bus implements conversion between serial communication and parallel communication for data to be transmitted. In some embodiments, the UART interface is generally configured to connect the processor 110 to the wireless communication module 160. For example, the processor 110 communicates with a Bluetooth module in the wireless communication module 160 by using the UART interface, to implement a Bluetooth function. In some embodiments, the audio module 170 may transmit an audio signal to the wireless communication module 160 by using the UART interface, to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by software. The GPIO interface may be configured as a control signal, or may be configured to transmit a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, for example, may be a Mini USB interface, a Micro USB interface, a USB Type C interface, or the like. The USB interface 130 may be configured to connect to the charger to charge the electronic device 100, or may be configured to transmit data between the electronic device 100 and a peripheral device. The USB interface 130 may alternatively be configured to connect to a headset, to play audio by using the headset. The interface may alternatively be configured to connect to another electronic device, for example, an AR device.

It may be understood that the interface connection relationship between modules shown in this embodiment of the present invention is merely an example for description, and does not constitute a structural limitation on the electronic device 100. In some other embodiments of this application, the electronic device 100 may alternatively use an interface connection mode different from that in the foregoing embodiment, or a combination of a plurality of interface connection modes.

The charging management module 140 is configured to receive charging input from the charger. The charger may be a wireless charger or a wired charger. In some wired charging embodiments, the charging management module 140 may receive charging input from the wired charger by using the USB interface 130. In some wireless charging embodiments, the charging management module 140 may receive wireless charging input by using a wireless charging coil of the electronic device 100. When charging the battery 142, the charging management module 140 may further supply power to the electronic device by using the power management module 141.

The power management module 141 is configured to connect the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover a single or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transmitted to the application processor. The application processor outputs an audio signal by using an audio device (not limited to the speaker 170A, the receiver 170B, or the like), or displays an image or a video by using the display 194. In some embodiments, the modem processor may be an independent device. In some other embodiments, the modem processor may be independent of the processor 110, and disposed in a same device with the mobile communication module 150 or another function module.

The wireless communication module 160 may provide a wireless communication solution that is applied to the electronic device 100 and that includes a wireless local area network (wireless local area network, WLAN) (for example, a Wireless Fidelity (Wireless Fidelity. Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR), or the like. For example, the wireless communication module 160 may be configured to implement the method for automatically switching a Bluetooth audio coding scheme provided in the embodiment of this application. The wireless communication module 160 may be one or more devices integrating at least one communication processing module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave by using the antenna 2 for radiation.

In this embodiment of this application, a source side and a playback side may exchange messages by using Bluetooth of the wireless communication module 160, or the source side may send a Bluetooth audio data packet to the playback side by using Bluetooth of the wireless communication module 160.

In some embodiments, the antenna 1 of the electronic device 100 is coupled to the mobile communication module 150, and the antenna 2 is coupled to the wireless communication module 160, so that the electronic device 100 can communicate with a network and another device by using a wireless communications technology. The wireless communications technology may include a technology such as a Global System for Mobile Communications (global system for mobile communications, GSM), a general packet radio service (general packet radio service, GPRS), Code Division Multiple Access (code division multiple access, CDMA), Wideband Code Division Multiple Access (wideband code division multiple access, WCDMA), Time-Division Code Division Multiple Access (time-division code division multiple access, TD-CDMA), Long Term Evolution (long term evolution, LTE), BT, GNSS, WLAN. NFC, FM, and/or IR. The GNSS may include a global positioning system (global positioning system. GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculations for graphics rendering. The processor 110 may include one or more GPUs that execute a program instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, and an optical signal is converted into an electrical signal. The photosensitive element of the camera transmits the electrical signal to the ISP for processing, so that the ISP converts the electrical signal into an image visible to naked eyes. The ISP can further perform algorithm optimization on noise, brightness, and a skin color of the image. The ISP can further optimize parameters of a photographing scene, such as an exposure and a color temperature. In some embodiments, the ISP may be disposed in the camera 193.

The camera 193 is configured to capture a static image or a video. The lens generates an optical image for an object, and the optical image is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and can process another digital signal in addition to the digital image signal. For example, when the electronic device 100 selects a frequency, the digital signal processor is configured to perform Fourier transform on energy of the frequency.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural network (neural-network, NN) computing processor. By drawing on the experience of a structure of a biological neural network, for example, by drawing on the experience of a transmission mode between human brain neurons, the NPU quickly processes input information, and can further continuously perform self-learning. The NPU may be used to implement an application such as intelligent cognition of the electronic device 100, for example, image recognition, facial recognition, speech recognition, and text understanding.

The external memory interface 120 may be configured to connect to an external memory card such as a micro SD card, to expand a storage capability of the electronic device 100. The external memory card communicates with the processor 110 by using the external memory interface 120, to implement a data storage function. For example, a file such as music or a video is stored in the external memory card.

The internal memory 121 may be configured to store computer executable program code, and the executable program code includes an instruction. The processor 110 executes various functional applications and data processing of the electronic device 100 by running the instruction stored in the internal memory 121. The internal memory 121 may include a program storage area and a data storage area. The program storage area may store an operating system, an application program required by at least one function (for example, a sound playing function or an image playing function), and the like. The data storage area may store data (for example, audio data or an address book) created in a process of using the electronic device 100, and the like. In addition, the internal memory 121 may include a high-speed random access memory, and may further include a non-volatile memory, such as at least one magnetic disk storage device, a flash storage device, or a universal flash storage (universal flash storage, UFS).

The electronic device 100 may implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

In this embodiment of this application, the audio module may determine, based on different applications, different audio data packets, or the like, Bluetooth coding schemes used for encoding the audio data packets.

The speaker 170A, also referred to as a "horn", is configured to convert an audio electrical signal into a sound signal. The electronic device 100 may be used to listen to music or listen to a hands-free call by using the speaker 170A.

The receiver 170B, also referred to as an "earpiece", is configured to convert an audio electrical signal into a sound signal. When the electronic device 100 is used to answer a call or listen to voice information, a voice may be listened to by placing the receiver 170B close to a human ear.

The microphone 170C, also referred to as a "mic" or a "mike", is configured to convert a sound signal into an electrical signal. When making a call or sending voice information, a user may place the microphone 170C close to a human mouth and make a sound, to input a sound signal to the microphone 170C. At least one microphone 170C may be disposed in the electronic device 100. In some other embodiments, two microphones 170C may be disposed in the electronic device 100, to further implement a noise reduction function in addition to collecting a sound signal. In some other embodiments, three, four, or more microphones 170C may be disposed in the electronic device 100, to collect a sound signal, reduce noise, identify a sound source, implement a directional recording function, and the like.

The headset jack 170D is configured to connect to a wired headset. The headset jack 170D may be the USB interface 130, or may be a 3.5 mm Open Mobile Terminal Platform (open mobile terminal platform, OMTP) standard interface or a Cellular Telecommunications Industry Association of the USA (cellular telecommunications industry association of the USA, CTIA) standard interface.

In some scenarios, for example, the electronic device 100 connected to a wireless Bluetooth headset may alternatively implement an audio function such as music playback by using the audio module 170, the wireless communication module 160, the application processor, and the like.

The audio module 170 is configured to encode an audio signal, and convert digital audio information into an analog audio signal. The wireless communication module 160 is configured to output the analog audio signal. In some embodiments, the audio module 170 may be disposed in the processor 110, or some function modules of the audio module 170 may be disposed in the processor 110. For example, the audio module 170 may be the application processor in the processor 110.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates with a conducting material. When force is applied to the pressure sensor 180A, a capacitance between electrodes changes. The electronic device 100 determines pressure strength based on a capacitance change. When a touch operation is performed on the display 194, the electronic device 100 detects strength of the touch operation based on the pressure sensor 180A The electronic device 100 may further calculate a touch position based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS application icon, an instruction for viewing an SMS message is executed. When a touch operation whose touch operation strength is greater than or equal to the first pressure threshold is performed on the SMS application icon, an instruction for creating an SMS message is executed.

The gyro sensor 180B may be configured to determine a motion posture of the electronic device 100. In some embodiments, angular velocities of the electronic device 100 around three axes (that is, x, y, and z axes) may be determined by using the gyro sensor 180B. The gyro sensor 180B may be used for image stabilization during photographing. For example, when the shutter is opened, the gyro sensor 180B detects a shake angle of the electronic device 100, calculates, based on the angle, a distance that needs to be compensated by a lens module, and enables the lens to counteract the shake of the electronic device 100 by performing reverse motion, thereby implementing image stabilization. The gyro sensor 180B may be further used for navigation and motion sensing games.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip carrying case by using the magnetic sensor 180D. In some embodiments, when the electronic device 100 is a flip phone, the electronic device 100 can detect opening and closing of a flip cover based on the magnetic sensor 180D. Further, based on a detected open/close status of the carrying case or a detected open/close status of the flip cover, a feature such as automatic unlocking upon opening of the flip cover is set.

The acceleration sensor 180E may detect magnitudes of accelerations of the electronic device 100 in various directions (generally three axes). A magnitude and a direction of gravity may be detected when the electronic device 100 is stationary. The acceleration sensor 180E may be further configured to identify a posture of the electronic device, to be applied to applications such as landscape/portrait mode switching and a pedometer.

The distance sensor 180F is configured to measure a distance. The electronic device 100 may measure a distance by using infrared light or a laser. In some embodiments, in a photographing scenario, the electronic device 100 may measure a distance by using the distance sensor 180F, to implement fast focusing.

The optical proximity sensor 180G may include, for example, a light-emitting diode (LED) and a light detector such as a photodiode. The light-emitting diode may be an infrared light-emitting diode. The electronic device 100 emits infrared light outwards by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 nearby the ear for a call, to automatically turn off the screen to save power. The optical proximity sensor 180G may be further used for automatic unlocking or locking in a carrying case mode or a pocket mode.

The ambient light sensor 180L is configured to sense ambient light luminance. The electronic device 100 may adaptively adjust luminance of the display 194 based on the sensed ambient light luminance. The ambient light sensor 180L may be further configured to automatically adjust white balance during photographing. The ambient light sensor 180L may further cooperate with the optical proximity sensor 180G to detect whether the electronic device 100 is in a pocket, to prevent accidental touch.

The fingerprint sensor 180H is configured to collect a fingerprint. The electronic device 100 may implement fingerprint unlocking, access to an application lock, fingerprint photographing, fingerprint answering, and the like by using a collected fingerprint feature.

The temperature sensor 180J is configured to detect a temperature. In some embodiments, the electronic device 100 executes a temperature processing policy by using the temperature detected by the temperature sensor 1803. For example, when the temperature reported by the temperature sensor 180W exceeds a threshold, the electronic device 100 reduces performance of a processor located near the temperature sensor 1803, to reduce power consumption and implement heat protection. In some other embodiments, when the temperature is lower than another threshold, the electronic device 100 heats the battery 142, to avoid abnormal shutdown of the electronic device 100 caused by a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transmit the detected touch operation to the application processor, to determine a touch event type. Visual output related to the touch operation may be provided by using the display 194. In some other embodiments, the touch sensor 180K may alternatively be disposed on a surface of the electronic device 100, and at a position different from that of the display 194.

The bone conduction sensor 180M may obtain a vibration signal. In some embodiments, the bone conduction sensor 180M may obtain a vibration signal of a vibrating bone block of a vocal part of a human body. The bone conduction sensor 180M may further be in contact with a pulse of the human body and receive a blood pressure pulse signal. In some embodiments, the bone conduction sensor 180M may alternatively be disposed in a headset, to form a bone conduction headset. The audio module 170 may obtain, by parsing, a voice signal based on the vibration signal that is of the vibrating bone block of the vocal part and that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, or the like. The key 190 may be a mechanical button, or may be a touch-sensitive key. The electronic device 100 may receive a key input, and generate a key signal input related to user setting and function control of the electronic device 100.

The motor 191 may generate a vibration alert. The motor 191 may be configured to generate a vibration alert for an incoming call, or generate a vibration feedback for a touch operation. For example, touch operations performed on different applications (for example, photographing and audio playback) may correspond to different vibration feedback effects. The motor 191 may further enable touch operations performed on different areas of the display 194 to correspond to different vibration feedback effects. Different application scenarios (for example, a time reminder, information receiving, an alarm clock, and a game) may also correspond to different vibration feedback effects. A vibration feedback effect for a touch operation may alternatively be customized.

The indicator 192 may be an indicator lamp, and may be configured to indicate a charging status and a battery level change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 may be compatible with different types of SIM cards. The SIM card interface 195 may also be compatible with an external memory card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100, and cannot be separated from the electronic device 100.

In an example, the electronic device 100 may include a hardware structure shown in FIG. 3-1. As shown in FIG. 3-1, a system on a chip (system on a chip, SoC) may include a central processing unit (central processing unit. CPU), an NPU, a GPU, a DSP, an ISP, a baseband chip, a radio frequency chip, and a memory. The CPU is mainly configured to interpret a computer instruction and process data, and control and manage the entire electronic device 100, for example, perform timing control, digital system control, radio frequency control, power saving control, and man-machine interface control. The NPU, the GPU, the DSP, and the ISP are respectively configured to implement functions of the NPU, the GPU, the DSP, and the ISP in the processor 110 of the electronic device 100 shown in FIG. 3. The baseband chip is mainly used for signal processing and protocol processing to implement a function related to mobile communication. For example, the baseband chip may be configured to implement a function of the mobile communication module 150 in FIG. 3, and mobile communication-related functions of the modem processor, the baseband processor, and the like in the processor 110. For example, the baseband chip may further implement a function of the wireless communication module 160 in FIG. 3. The radio frequency chip is configured to perform radio frequency transmitting and receiving, frequency synthesis, power amplification, and the like. For example, the radio frequency chip may implement a function of the antenna 1 and some functions of the mobile communication module 150 in FIG. 3. For example, the radio frequency chip may further implement a function of the antenna 2 and some functions of the wireless communication module 160 in FIG. 3. In some examples, the SoC may further include an audio chip, a video chip, a secure element, and the like. The audio chip is configured to process an audio-related function, for example, implement a function of the audio module 170 in FIG. 3. The video chip is configured to process a video-related function, for example, implement a function of the video codec of the processor 110 in FIG. 3. The secure element is configured to implement functions related to system security, for example, encryption, decryption, and storage of security information.

FIG. 4 is a schematic structural diagram of an earbud (the earbud 200 in FIG. 2-1 or the left or right earbud in FIG. 2-2) of a wireless Bluetooth headset according to an embodiment of this application. As shown in FIG. 4, the earbud of the wireless Bluetooth headset may include a processor 201, a memory 202, a sensor 203, a wireless communication module 204, a receiver 205, a microphone 206, and a power supply 207.

The memory 202 may be configured to store application program code, for example, application program code used to establish a wireless connection to the other earbud of the wireless Bluetooth headset, and enable the earbud to be paired with and connected to the electronic device 100. The processor 201 may control execution of the application program code, to implement a function of the earbud of the wireless Bluetooth headset in this embodiment of this application.

The memory 202 may further store a Bluetooth address used to uniquely identify the earbud, and a Bluetooth address of the other earbud of the wireless Bluetooth headset. In addition, the memory 202 may further store connection data of an electronic device that was successfully paired with the earbud. For example, the connection data may be a Bluetooth address of the electronic device that was successfully paired with the earbud. Based on the connection data, the earbud can be automatically paired with the electronic device without configuring a connection between the earbud and the electronic device, for example, performing validity verification. The Bluetooth address may be a media access control (media access control, MAC) address.

The sensor 203 may be a distance sensor or an optical proximity sensor. The earbud may determine, by using the sensor 203, whether the earbud is worn by a user. For example, the earbud may detect, by using the optical proximity sensor, whether there is an object near the earbud, to determine whether the earbud is worn by the user. When determining that the earbud is worn, the earbud may turn on the receiver 205. In some embodiments, the earbud may further include a bone conduction sensor, to form a bone conduction headset. By using the bone conduction sensor, the earbud may obtain a vibration signal of a vibrating bone block of a vocal part, and obtain a voice signal by parsing, to implement a voice function. In some other embodiments, the earbud may further include a touch sensor, configured to detect a touch operation of the user. In some other embodiments, the earbud may further include a fingerprint sensor, configured to detect a user fingerprint, identify a user identity, and the like. In some other embodiments, the earbud may further include an ambient light sensor, and may adaptively adjust some parameters such as volume based on sensed ambient light luminance.

The wireless communication module 204 is configured to support short-distance data exchange between the earbud of the wireless Bluetooth headset and various electronic devices, for example, the electronic device 100. In some embodiments, the wireless communication module 204 may be a Bluetooth transceiver. The earbud of the wireless Bluetooth headset may establish a wireless connection to the electronic device 100 by using the Bluetooth transceiver, to implement short-distance data exchange between the earbud and the electronic device 100.

At least one receiver 205, which may also be referred to as an "earpiece", may be configured to convert an audio electrical signal into a sound signal and play the sound signal. For example, when the earbud of the wireless Bluetooth headset is used as an audio output device of the electronic device 100, the receiver 205 may convert a received audio electrical signal into a sound signal and play the sound signal.

At least one microphone 206, which may also be referred to as a "mic" or a "mike", is configured to convert a sound signal into an audio electrical signal. For example, when the earbud of the wireless Bluetooth headset is used as an audio input device of the electronic device 100, in a process in which the user speaks (for example, makes a call or sends a voice message), the microphone 206 may collect a sound signal of the user, and convert the sound signal into an audio electrical signal. The audio electrical signal may be an audio stream in this embodiment of this application.

The power supply 207 may be configured to supply power to each component included in the earbud of the wireless Bluetooth headset. In some embodiments, the power supply 207 may be a battery, such as a rechargeable battery.

Figure 5:
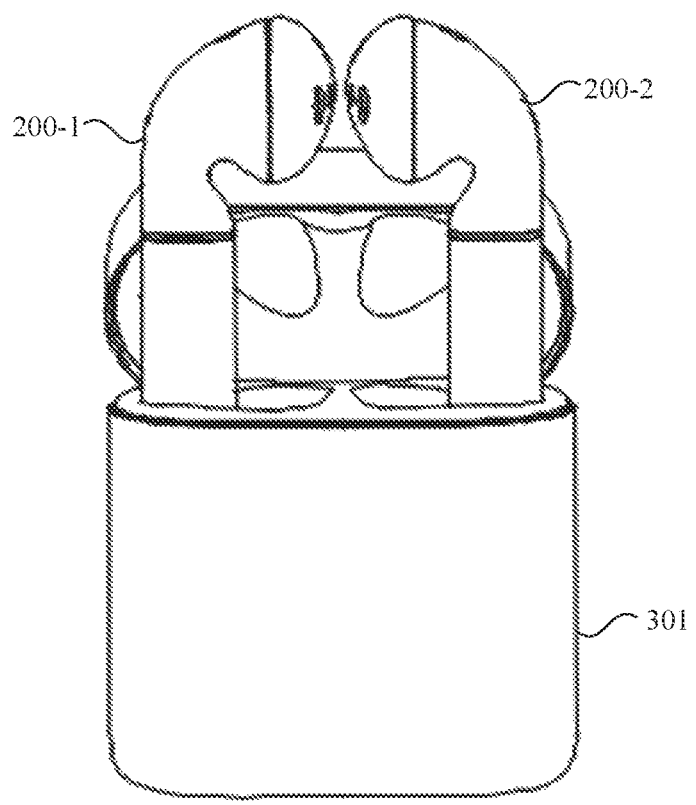
FIG. 5 is a schematic structural diagram 2 of an earbud to which a method for automatically switching a Bluetooth audio coding scheme is applicable according to an embodiment of this application.

Optionally, the wireless Bluetooth headset may be provided with a headset box (for example, 301 shown in FIG. 5). The headset box may be configured to house the left and right earbuds of the wireless Bluetooth headset. With reference to FIG. 2-2, as shown in FIG. 5, the headset box 301 may be configured to house a left earbud 200-1 and a right earbud 200-2 of a wireless Bluetooth headset. In addition, the headset box may further charge the left and right earbuds of the wireless Bluetooth headset. Correspondingly, in some embodiments, the earbud of the wireless Bluetooth headset may further include an input/output interface 208.

The input/output interface 208 may be configured to provide any wired connection between the earbud of the wireless Bluetooth headset and the headset box (such as the headset box 301). In some embodiments, the input/output interface 208 may be an electrical connector. When the earbud of the wireless Bluetooth headset is placed in the headset box, the earbud of the wireless Bluetooth headset may be electrically connected to the headset box (for example, to an input/output interface included in the headset box) by using the electrical connector. After the electrical connection is established, the headset box may charge the power supply 207 of the earbud of the wireless Bluetooth headset. After the electrical connection is established, the earbud of the wireless Bluetooth headset may further perform data communication with the headset box. For example, the earbud of the wireless Bluetooth headset may receive a pairing instruction from the headset box by using the electrical connection. The pairing instruction is used to instruct the earbud of the wireless Bluetooth headset to enable the wireless communication module 204, so that the earbud of the wireless Bluetooth headset can be paired with and connected to the electronic device 100 by using a corresponding wireless communications protocol (for example. Bluetooth).

Certainly, the earbud of the wireless Bluetooth headset may not include the input/output interface 208. In this case, the earbud may implement a charging or data communication function based on a wireless connection established to the headset box by using the wireless communication module 204.

In addition, in some embodiments, the headset box (for example, the headset box 301) may further include components such as a processor and a memory. The memory may be configured to store application program code, which is controlled and executed by the processor of the headset box, to implement a function of the headset box. For example, when the user opens a cover of the headset box, the processor of the headset box may send, by executing the application program code stored in the memory, a pairing instruction or the like to the earbud of the wireless Bluetooth headset in response to an operation of opening the cover by the user.

It may be understood that the structure shown in this embodiment of this application constitutes no specific limitation on the earbud of the wireless Bluetooth headset. The earbud of the wireless Bluetooth headset may include more or fewer components than those shown in FIG. 4, or combine two or more components, or have different component arrangements. For example, the earbud may further include components such as an indicator lamp (which may indicate a status such as a battery level of the earbud) and a dust filter (which may be used with an earpiece). The various components shown in FIG. 4 may be implemented in hardware including one or more signal processing or application-specific integrated circuits, software, or a combination of hardware and software.

It should be noted that structures of the left and right earbuds of the wireless Bluetooth headset may be the same. For example, both the left and right earbuds of the wireless Bluetooth headset may include the components shown in FIG. 4. Alternatively, the structures of the left and right earbuds of the wireless Bluetooth headset may be different. For example, one earbud (for example, the right earbud) of the wireless Bluetooth headset may include the components shown in FIG. 4, and the other earbud (for example, the left earbud) may include components other than the microphone 206 in FIG. 4.

Figure 6:
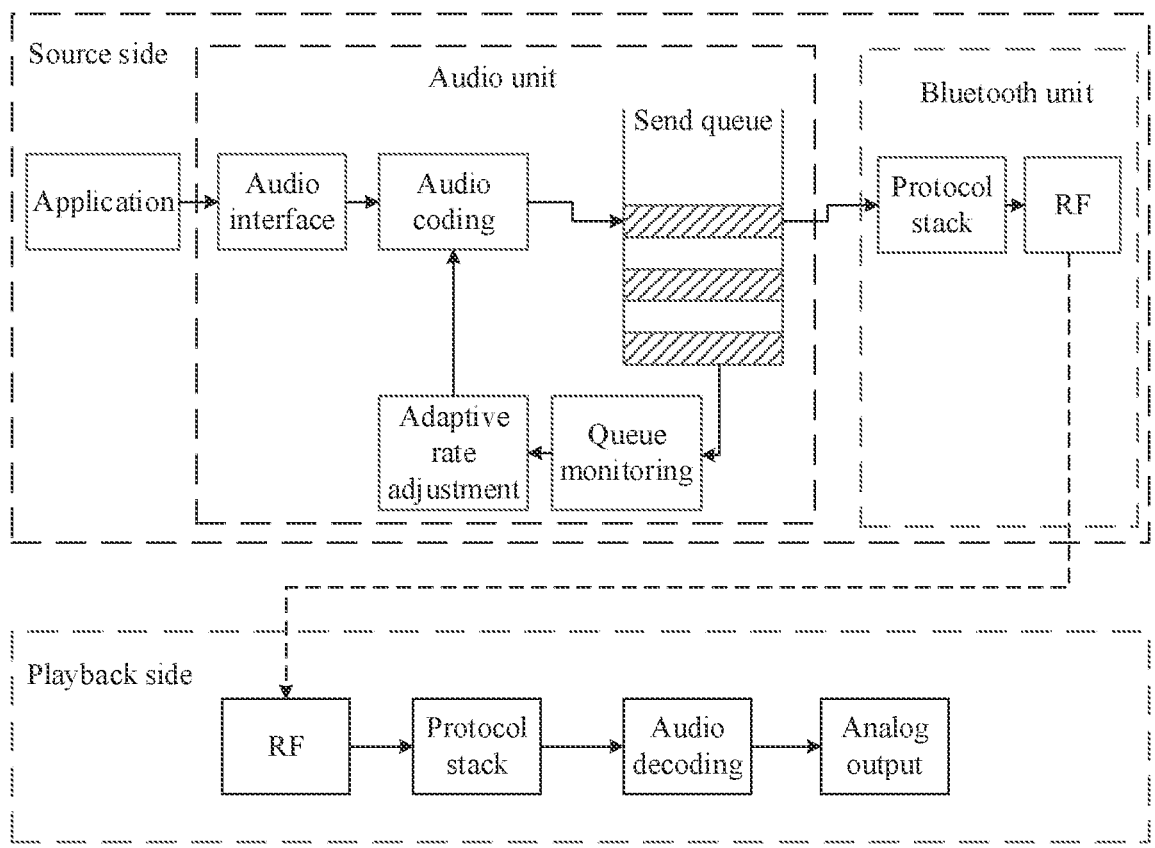
FIG. 6 is a schematic architectural diagram of a Bluetooth audio playback system according to an embodiment of this application.

The method for automatically switching a Bluetooth audio coding scheme provided in the embodiment of this application may be applied to the systems shown in FIG. 1 to FIG. 2-4. In an example, the systems shown in FIG. 1 to FIG. 2-4 may include an architecture shown in FIG. 6. As shown in FIG. 6, the architecture includes a source side and a playback side. Audio of the source side is played by the playback side by using a Bluetooth advanced audio distribution profile (advanced audio distribution profile, A2DP) playback technology. In some embodiments, the source side is the master device in FIG. 1, and the playback side is the peripheral device in FIG. 1. In some embodiments, the source side is the electronic device 100 in FIG. 2-1, and the playback side is the earbud 200 in FIG. 2-1. In some embodiments, the source side is the electronic device 100 in FIG. 2-2, and the playback side is the left earbud 200-1 or the right earbud 200-2 in FIG. 2-2. Certainly, when the electronic device 100 sends audio data to both the left earbud 200-1 and the right earbud 200-2, this embodiment of this application does not limit a sequence in which the electronic device 100 sends the audio data to the left earbud 200-1 and the electronic device 100 sends the audio data to the right earbud 200-2. In some embodiments, the source side is the electronic device 100 in FIG. 2-3, and the playback side is the left earbud 200-1 in FIG. 2-3. In some embodiments, the source side is the electronic device 100 in FIG. 2-4, and the playback side is the left earbud 200-1 in FIG. 2-4.

The source side may include an application, an audio unit, a Bluetooth unit, and the like. The playback side may include an RF, a protocol stack, audio decoding, analog output, and the like. It should be noted that the architecture in FIG. 6 constitutes no limitation on this embodiment of this application. In practice, the architecture in this embodiment of this application may include more or fewer units.

Source-side applications may include various applications capable of providing an audio source, such as music, an online real-time game application, an online interactive entertainment application, a live streaming application, an online video, a local video, and a voice call.

The audio unit is configured to process audio data. For example, the audio unit receives audio data from an application, encodes the audio data, and transmits the encoded data to the Bluetooth unit. In an example, a function of the audio unit may be implemented by the audio module 170 in FIG. 3, or may be implemented by the application processor in the processor 110 in FIG. 3. In an example, the audio unit may be implemented by the audio chip in FIG. 3-1, or a function of the audio unit may be implemented by the DSP in FIG. 3-1.

It should be noted that in this embodiment of this application, chip function division is merely an example. In actual application, the foregoing functions may be allocated to different chip entities based on a requirement for implementation. Functions of the chips in the embodiments of this application may be implemented by one physical chip entity, or may be jointly implemented by a plurality of physical chip entities, or functions of two or more chips may be implemented by one physical chip. This does not constitute a limitation on the implementation of this solution.

The Bluetooth unit is configured to send a data packet output by the audio unit to the playback side in a Bluetooth transmission mode. In an example, a function of the Bluetooth unit may be implemented by the wireless communication module 160 in FIG. 3. In another example, a function of the Bluetooth unit may be implemented by the radio frequency chip in FIG. 3-1. In an implementation, the Bluetooth unit may include modules such as a protocol stack and an RF. The data packet output by the audio unit is sent to the protocol stack, and is encapsulated layer by layer into a Bluetooth data packet that meets specifications of the Bluetooth protocol stack. The Bluetooth data packet is converted into an analog audio signal by the RF for output.

The RF on the playback side may be configured to receive an analog audio signal output by the source side, and convert the analog audio signal into a digital audio signal (a Bluetooth data packet). Through the protocol stack on the playback side, the Bluetooth data packet is decapsulated layer by layer and converted into a compressed data packet.

An audio decoding unit is configured to decompress the compressed data packet. Generally, a decoding scheme used by the audio decoding unit on the playback side corresponds to a Bluetooth coding scheme used by the audio unit on the source side.

An analog output unit is configured to convert the decompressed data packet into an analog audio signal, and play the analog audio signal.

In some embodiments, the audio unit on the source side may include modules such as an audio interface and an audio coding module. The audio interface is an interface module between an application and the audio unit, and is configured to manage audio data received from the application, for example, perform sampling, channel selection, and audio mixing. The audio interface further converts the received audio data (for example, an MP3 data packet) into a pulse code modulation (pulse code modulation, PCM) data packet. The audio coding module is configured to encode the PCM data packet to form a compressed data packet. For example, a Bluetooth coding scheme of the audio coding module may include a constant bitrate (constant bitrate, CBR), a variable bitrate (variable bitrate, VBR), and an average bitrate (average bitrate, ABR).

A bitrate, also referred to as a bit rate, indicates an amount of data transmitted in a unit time, and is generally expressed in kbps. A higher bit rate indicates a smaller data compression ratio, a smaller audio quality loss, and a closer audio quality to the audio source. Correspondingly, an encoded audio file is larger. A lower bit rate indicates a larger data compression ratio and a greater audio quality loss. Correspondingly, an encoded audio file is smaller.

The CBR indicates that a file is encoded at one bit rate during the entire compression.

The VBR indicates that during compression, a bit rate is determined in real time based on content of audio data. For example, content of an audio segment is complex and has many elements, and a relatively high bit rate is allocated. Content of an audio segment is simple and has only a few elements, and a relatively low bit rate is allocated.

The ABR is an interpolation parameter of the VBR, and is between the VBR and the CBR. In a specified average bit rate, a relatively low bit rate is allocated to low-frequency and insensitive audio frequencies, and a relatively high bit rate is allocated to high-frequency and high-dynamic audio frequencies at a fixed interval (for example, 50 frames). For example, when an ABR 192 kbps is specified to encode an audio file, 85% of the audio file is fixedly encoded at the bit rate 192 kbps, and then the remaining 15% is dynamically optimized; a complex part is encoded at a bit rate higher than 192 kbps, and a simple part is encoded at a bit rate lower than 192 kbps.

For example, the audio coding module may be implemented by a Bluetooth audio codec (Bluetooth audio coding algorithm). For example, common Bluetooth audio codecs include sub-band coding (sub-band coding, SBC), advanced audio coding (advanced audio coding, AAC), aptX, LDAC, HWA, and the like, and aptX may be classified into conventional aptX, aptX low latency (aptX low latency, aptX LL), and aptX high definition (aptX HD).

In an example, for a Bluetooth audio codec that supports the ABR, such as LDAC or HWA, a bit rate of the Bluetooth audio codec may be adjusted based on a waterline of a send queue, and the waterline is a preset threshold of an amount of data that can be stored in the send queue. For example, as shown in FIG. 6, external interference decreases a throughput capability of a Bluetooth air interface, and an amount of data stored in the send queue increases and exceeds the preset threshold, that is, the send queue overflows the waterline. A queue monitoring module detects that the send queue overflows the waterline, and triggers an adaptive rate adjustment module to reduce the bit rate of the Bluetooth audio codec. In this way, an amount of data entering the send queue in a unit time is reduced, and the situation that the send queue overflows the waterline is eliminated, thereby achieving an anti-interference capability.

Figure 7:
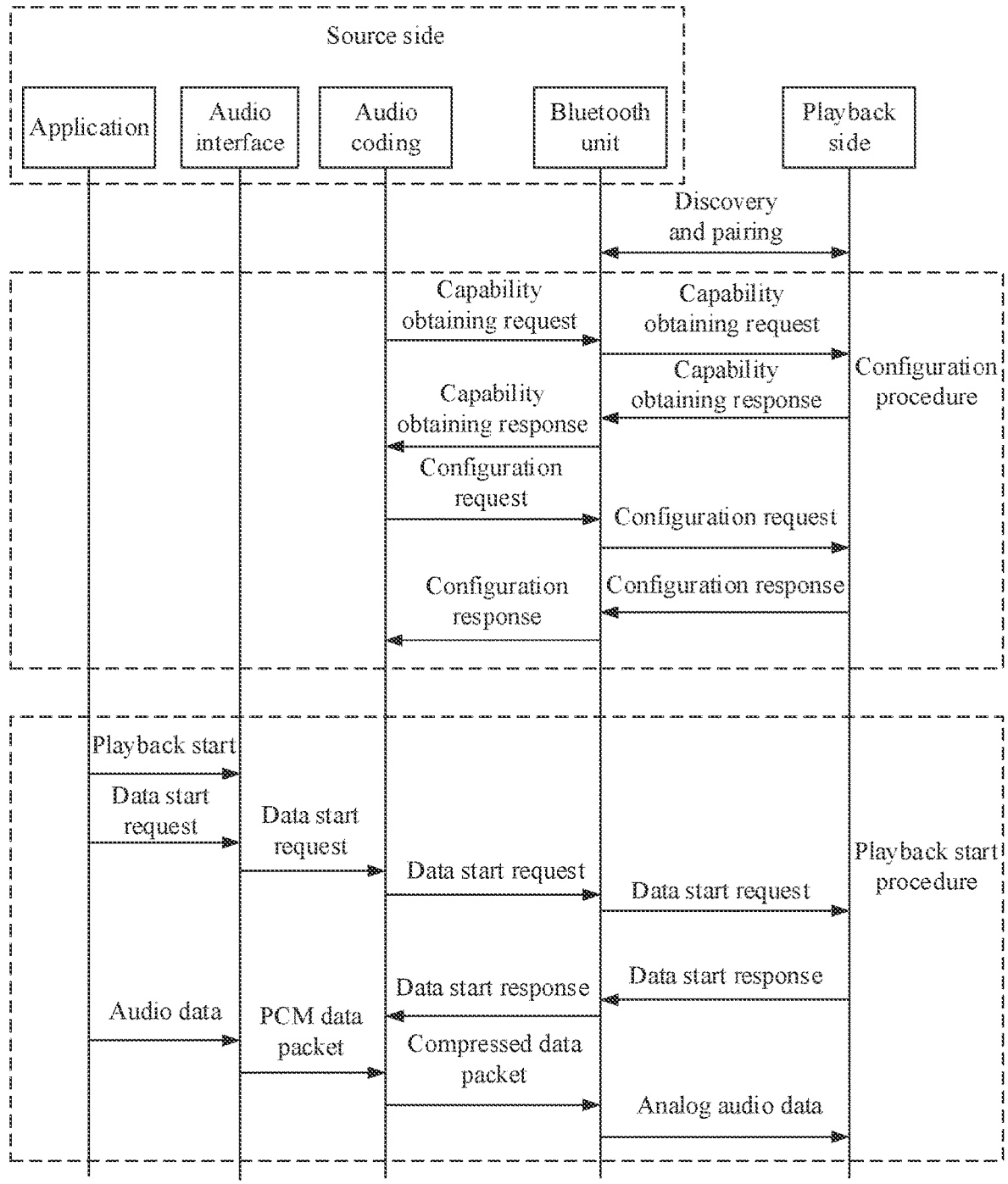
FIG. 7 is a schematic flowchart of a method for automatically switching a Bluetooth audio coding scheme according to an embodiment of this application.

For example, FIG. 7 shows a method procedure in which audio on the source side is played by the playback side by using an A2DP playback technology.

Step 1: The source side and the playback side first discover each other, and then successfully implement Bluetooth pairing.

Step 2: Configure related parameters on the source side and the playback side.

For example, the audio coding module sends a capability obtaining request to the playback side by using the Bluetooth unit, to request to obtain capability information of the playback side. For example, the capability information may include a supported Bluetooth audio codec type (or a bit rate of the Bluetooth audio codec), an audio sampling rate, an audio bit width, and the like. The sampling rate (also referred to as a sampling speed or a sampling frequency) indicates a quantity of samples extracted from continuous signals (analog signals) and formed into discrete signals (digital signals) in a unit time, and is expressed in hertz (Hz). The audio bit width is equivalent to a quantity of colors of a picture, and indicates an amount of data in each sample. If the amount of data is larger, the audio is played back more accurately. For example, a phone has a sampling rate of 3 kHz and a bit width of 7 bits, and a compact disc (compact disc, CD) has a sampling rate of 44.1 kHz and a bit width of 16 bits.

A capability obtaining response sent by the playback side to the source side carries the capability information of the playback side.

The source side determines a configuration parameter based on the capability information of the playback side. For example, the capability information of the playback side is: supported Bluetooth audio codec types including HWA, aptX, aptX HD, aptX LL, and AAC; supported audio sampling rates including 48 kHz, 44.1 kHz, 32 kHz, 24 kHz, and 16 kHz; and supported audio bit widths including 8 bits and 16 bits. Bluetooth audio codec types supported by the source side include HWA, aptX, aptX HD, aptX LL, and SBC; audio sampling rates supported by the source side include 48 kHz, 44.1 kHz, 24 kHz, and 8 kHz; and audio bit widths supported by the source side include 8 bits and 16 bits. In an implementation, the source side may select a parameter supported by both the source side and the playback side as the configuration parameter. For example, the source side determines that the configuration parameter is as follows: a Bluetooth audio codec type is HWA, an audio sampling rate is 44.1 kHz. and an audio bit width is 16 bits.

Then, the audio coding module sends a configuration request to the playback side by using the Bluetooth unit, and the configuration request includes the configuration parameter. The playback side obtains the configuration parameter and sends a configuration response to the source side. In this way, the source side and the playback side reach a consensus on the configuration parameter through negotiation.

Step 3: Start a playback procedure.

The application on the source side indicates the audio unit to start playing. Then, the application sends a data start request to the audio unit. The audio interface of the audio unit sends the received data start request to the audio coding module. The audio coding module sends the data start request to the Bluetooth unit, and the Bluetooth unit sends the data start request to the playback side. In an implementation, the audio coding module further receives a data start response from the playback side by using the Bluetooth unit. The audio interface receives audio data from the application, converts the audio data into a PCM data packet, and sends the PCM data packet to the audio coding module. The audio coding module encodes the PCM data packet into a compressed data packet, and sends the compressed data packet to the playback side by using the Bluetooth unit.

A Bluetooth audio codec used by the audio coding module on the source side to encode the PCM data packet is determined based on the configuration parameter determined in the configuration procedure. For example, the configuration parameter determined in the configuration procedure is as follows: a Bluetooth audio codec type is HWA, an audio sampling rate is 44.1 kHz, and an audio bit width is 16 bits. In this case, the audio coding module on the source side uses HWA for encoding. Correspondingly, after receiving the audio data, the playback side decodes the audio data by using HWA.

In the foregoing embodiment, after negotiating a type of a Bluetooth audio codec, the source side and the playback side encode the audio data by using the Bluetooth audio codec. In the absence of interference, a highest bit rate supported by the Bluetooth audio codec is generally used for transmission. When there is interference, for a Bluetooth audio codec that supports the ABR, a bit rate of the Bluetooth audio codec may be adjusted based on a waterline of a send queue.

Generally, Bluetooth transmission cannot well balance sound quality and a latency of audio played by a Bluetooth device. This is because high sound quality corresponds to a high bit rate, that is, a large amount of data transmitted in a unit time. Due to a limitation of an air interface transmission rate, a duty cycle is high, and a link is more likely unstable. As a result, more retransmissions occur, and a latency is caused. In addition, to prevent the send queue from exceeding the waterline, the send queue needs to be set to a large size, which also causes a latency. In addition, a higher bit rate leads to a higher buffering latency on the playback side. High sound quality generally corresponds to a high latency.

If the bit rate of the Bluetooth audio codec used for encoding on the source side is high, audio quality and a latency of the audio played on the playback side are high. If the bit rate of the Bluetooth audio codec used for encoding on the source side is low, the audio quality and the latency of the audio played on the playback side are low.

When playing audio by using the Bluetooth device, a user has different requirements on audio quality and a latency when operating different applications. For example, the user operates a music application, and high sound quality can bring better user experience. For example, the user operates a real-time game application, and a low latency can bring better user experience.

An embodiment of this application provides a method for automatically switching a Bluetooth audio coding scheme, to adjust a bit rate of a Bluetooth audio codec based on a user scenario, thereby improving user experience.

Figure 8:
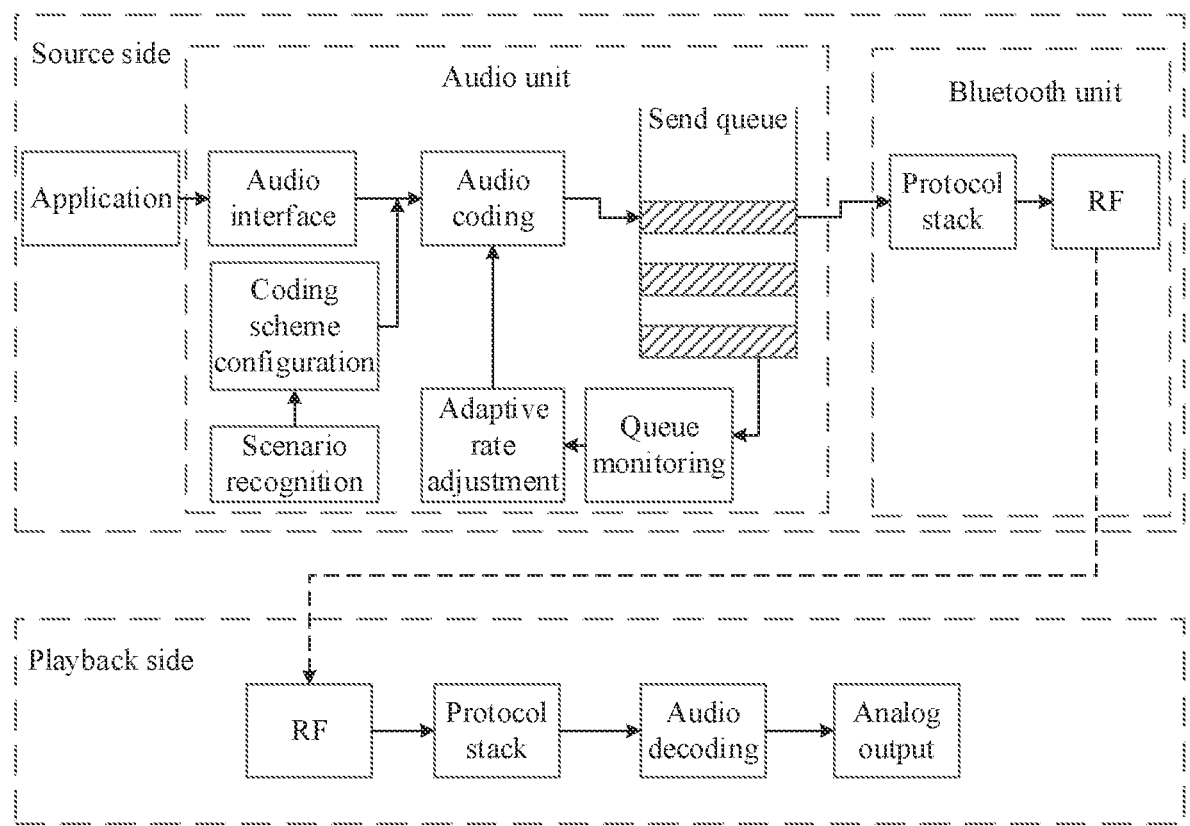
FIG. 8 is a schematic architectural diagram 2 of a Bluetooth audio playback system according to an embodiment of this application.

In some embodiments, as shown in FIG. 8, the audio unit on the source side may further include a scenario recognition module and a coding scheme configuration module. In an example, functions of the scenario recognition module and the coding scheme configuration module may be implemented by the audio module 170 in FIG. 3, or may be implemented by the application processor in the processor 110 in FIG. 3. In an example, the scenario recognition module and the coding scheme configuration module may be implemented by the audio chip in FIG. 3-1, or functions of the scenario recognition module and the coding scheme configuration module may be implemented by the DSP in FIG. 3-1.

In some embodiments, when a first application is running, a first Bluetooth coding scheme is used to encode an audio data packet that is of the first application and that is sent by a first device to a second device. When a second application is running, a second Bluetooth coding scheme is used to encode an audio data packet that is of the second application and that is sent by the first device to the second device. For example, the first device is an electronic device on the source side in this embodiment of this application, and the second device is an electronic device on the playback side in this embodiment of this application. The first application and the second application are two applications that can run on the electronic device on the source side. The first Bluetooth coding scheme is different from the second Bluetooth coding scheme.

In some embodiments, in response to a user operation, an application of an application unit on the source side starts to run. In response to application startup, the scenario recognition module determines a current application identifier. For example, the application identifier may be a name of the application. In an implementation, the scenario recognition module detects an application running in the foreground, and determines a current application identifier. For example, the scenario recognition module detects that the application running in the foreground is Huajiao Live Streaming, and then determines that the current application identifier is Huajiao Live Streaming. For example, the scenario recognition module detects that the application running in the foreground is QQ Music, and then determines that the current application identifier is QQ Music. In an implementation, the scenario recognition module determines the current application identifier based on a playback start message sent by the application on the source side to the audio unit in FIG. 7. For example, the playback start message includes a package name of an application, and the current application identifier may be determined based on the package name of the application.

In some embodiments, the scenario recognition module determines a user scenario based on the current application identifier, and different user scenarios are scenarios in which the user performs Bluetooth audio playback on different applications. For example, the user scenarios may include local music playback, online music playback, local video playback, cellular online video playback, Wi-Fi online video playback, online real-time games, online real-time music interactive entertainment (for example, online singing), a call, and the like.

In an implementation, the scenario recognition module determines an application category to which the current application belongs, to determine a user scenario. The application category may include music playback, a video, a real-time game, music interaction, a call, or the like.

For example, an application whitelist is preconfigured on the source side, and the application whitelist includes one or more application identifiers and an application category corresponding to each application identifier. The scenario recognition module determines an application category of the current application based on the current application identifier and the application whitelist. For example, the application whitelist is shown in Table 1. The current application identifier is QQ Music, and the scenario recognition module determines, based on Table 1, that the application category is music playback.

TABLE 1

| Application Name | Application Category |
|---|---|
| QQ Music | Music playback |
| BaoFeng | Video |
| iQIYI | Video |
| WeSing | Music interaction |
| Huajiao Live Streaming | Video |
| Honor of Kings | Real-time game |
| Phone | Call |

For example, in another manner, a data packet of an application includes application category information, and the scenario recognition module determines an application category of the application based on the obtained application category information of the data packet of the application. For example, the scenario recognition module obtains a data packet of an application, and determines that application category information in the data packet is a real-time game.

Further, in an implementation, the scenario recognition module determines a user scenario based on the application category. For example, if the scenario recognition module determines that the application category is a real-time game, the scenario recognition module determines that the user scenario is an online real-time game scenario.

In an implementation, the scenario recognition module further determines a network state, and determines a user scenario based on the application category and the network state. For example, the network state may include a Wi-Fi state, a cellular state, or a local state. For example, if the scenario recognition module determines that a Wi-Fi connection is in use, the scenario recognition module determines that the network state is the Wi-Fi state; if the scenario recognition module determines that a Wi-Fi connection does not exist or a Wi-Fi resource is idle, and determines that a cellular network connection is in use, the scenario recognition module determines that the network state is the cellular state; or if the scenario recognition module determines that a Wi-Fi connection does not exist or a Wi-Fi resource is idle, and determines that a cellular network connection does not exist or a cellular resource is idle, the scenario recognition module determines that the network state is the local state. For example, if the scenario recognition module determines that the application category is a video and the network state is the Wi-Fi state, the scenario recognition module determines that the user scenario is a Wi-Fi online video playback scenario. For example, if the scenario recognition module determines that the application category is a video and the network state is the cellular state, the scenario recognition module determines that the user scenario is a cellular online video playback scenario. For example, if the scenario recognition module determines that the application category is a video and the network state is the local state, the scenario recognition module determines that the user scenario is a local video playback scenario (for example, a local video or a video cached locally in an online video application is played). For example, if the scenario recognition module determines that the application category is music playback and the network state is the Wi-Fi state or the cellular state, the scenario recognition module determines that the user scenario is online music playback. For example, if the scenario recognition module determines that the application category is music playback and the network state is the local state, the scenario recognition module determines that the user scenario is local music playback. For example, if the scenario recognition module determines that the application category is a real-time game and the network state is the Wi-Fi state or the cellular state, the scenario recognition module determines that the user scenario is an online real-time game. For example, if the scenario recognition module determines that the application category is music interaction and the network state is the Wi-Fi state or the cellular state, the scenario recognition module determines that the user scenario is online real-time music interactive entertainment.

It should be noted that user scenario division in this embodiment of this application is merely an example for description. This is not limited in this embodiment of this application.

The coding scheme configuration module is configured to determine a corresponding Bluetooth coding scheme based on the user scenario.

For example, user scenarios may be classified into a high sound quality category, a low latency category, a medium sound quality category, and the like based on user experience. For example, in music playback scenarios such as local music playback and online music playback, high sound quality brings good user experience. Therefore, the music playback scenarios may be set to the high sound quality category. For example, in real-time interaction scenarios such as an online real-time game, a low latency brings good user experience. Therefore, real-time interaction scenarios may be set to the low latency category. For example, in a Wi-Fi online video playback scenario, a Wi-Fi resource is used to download an online video, and a Bluetooth resource is used to play audio data. Because Wi-Fi and Bluetooth share frequency resources, this scenario may be set to the medium sound quality category. In this way, a spare shared frequency resource not used for Bluetooth data packet transmission may be used for Wi-Fi data packet transmission, thereby ensuring downloading and playback of an online video. It should be noted that user scenario category division in this embodiment of this application is merely an example for description. This is not limited in this embodiment of this application.

In some embodiments, when Bluetooth and Wi-Fi share an antenna, a baseband chip includes a digital arbiter, configured to allocate shared frequency resources between Bluetooth and Wi-Fi. In some possible implementations, a priority of Bluetooth transmission is higher than that of Wi-Fi transmission. For example, when a shared frequency resource of Bluetooth and Wi-Fi is idle, the digital arbiter receives an instruction for transmitting Wi-Fi service data, and allocates the shared frequency resource to Wi-Fi transmission. In a process of transmitting the Wi-Fi service data, the digital arbiter receives an instruction for transmitting Bluetooth service data, and suspends the Wi-Fi transmission and allocates the shared frequency resource to Bluetooth transmission. Further, if the Bluetooth service data transmission ends, the digital arbiter reallocates the shared frequency resource to the Wi-Fi transmission. It should be noted that the digital arbiter may be implemented by using software, or may be implemented by using hardware. For example, the digital arbiter may be a software module of the baseband chip. This is not limited in this embodiment of this application. In some other embodiments, the digital arbiter may alternatively be included in a radio frequency chip or another chip. This is not limited in this embodiment of this application.

For example, the high sound quality category includes local music playback, online music playback, cellular online video playback, and local video playback; the low latency category includes an online real-time game; and the medium sound quality category includes Wi-Fi online video playback, online real-time music interactive entertainment, and a call.

For example, the Bluetooth coding scheme may include a high sound quality mode, a standard mode, or a low latency mode. For example, a bit rate in the high sound quality mode is greater than 560 kbps, a bit rate in the standard mode is greater than 300 kbps and less than or equal to 560 kbps, and a latency corresponding to the low latency mode is less than 50 ms. It should be noted that division of Bluetooth coding schemes and a division standard may be set based on an actual situation. The Bluetooth coding schemes and the bit rate value corresponding to each Bluetooth coding scheme shown in this embodiment of this application are merely examples for description. This is not limited in this embodiment of this application.

In an implementation, the coding scheme configuration module determines a Bluetooth coding scheme of an audio coding module based on the user scenario. For example, a Bluetooth coding scheme configuration table is preconfigured on the source side, and includes at least one record, and each record includes a correspondence between a user scenario and a Bluetooth coding scheme of the audio coding module. For example, if a user scenario belongs to the high sound quality category, the user scenario corresponds to the high sound quality mode of the audio coding module; if a user scenario belongs to the medium sound quality category, the user scenario corresponds to the standard mode of the audio coding module; and if a user scenario belongs to the low latency category, the user scenario corresponds to the low latency mode of the audio coding module. The coding scheme configuration module may determine the Bluetooth coding scheme of the audio coding module based on the user scenario and the Bluetooth coding scheme configuration table. For example, the Bluetooth coding scheme configuration table is shown in Table 2.

TABLE 2

| User Scenario | Bluetooth Coding Scheme |
|---|---|
| Local music playback | High sound quality mode |
| Online music playback | High sound quality mode |
| Local video playback | High sound quality mode |
| Cellular online video playback | High sound quality mode |
| Wi-Fi online video playback | Standard mode |
| Online real-time game | Low latency mode |
| Online real-time music interactive | Standard mode |
| Call | Standard mode |

In some embodiments, different Bluetooth coding schemes correspond to different Bluetooth audio codecs. For example, Bluetooth audio codecs corresponding to the high sound quality mode include LDAC, aptX HD, and HWA; Bluetooth audio codecs corresponding to the standard mode include SBC, AAC, and aptX; and Bluetooth audio codecs corresponding to the low latency mode include HWA LL and aptX LL. In this case, Table 2 may be in the form of Table 3 below.

TABLE 3

| User Scenario | Codec |
|---|---|
| Local music playback | HWA |
| Online music playback | HWA |
| Local video playback | HWA |
| Cellular online video playback | HWA |
| Wi-Fi online video playback | SBC |
| Online real-time game | HWALL |
| Online real-time music interactive entertainment | SBC |
| Call | SBC |

In some embodiments, different Bluetooth coding schemes correspond to different bit rate modes of a Bluetooth audio codec. For example, LDAC includes three bit rate modes: a sound quality precedence mode (a bit rate of 990 kbps), a standard mode (a bit rate of 660 kbps), and a connection precedence mode (a bit rate of 330 kbps). The three bit rate modes respectively correspond to three Bluetooth coding schemes: the high sound quality mode, the standard mode, and the low latency mode.

In some embodiments, the coding scheme configuration module determines the Bluetooth coding scheme of the audio coding module based on the current application identifier. For example, a second Bluetooth coding scheme configuration table is preconfigured on the source side, and includes at least one record, and each record includes a correspondence between an application identifier and a Bluetooth coding scheme of the audio coding module. The coding scheme configuration module determines the Bluetooth coding scheme of the audio coding module based on the current application identifier and the second Bluetooth coding scheme configuration table. For example, the second Bluetooth coding scheme configuration table is shown in Table 4.

TABLE 4

| Application Name | Bluetooth Coding Scheme |
| --- | --- |
| QQ Music | High sound quality mode |
| BaoFeng | High sound quality mode |
| iQIYI | Standard mode |
| WeSing | Standard mode |
| Huajiao Live Streaming | Standard mode |
| Honor of Kings | Low latency mode |
| Phone | Standard mode |

Further, the coding scheme configuration module configures the Bluetooth coding scheme of the audio coding module. For example, if the coding scheme configuration module determines that the Bluetooth coding scheme is the low latency mode, and a Bluetooth audio codec corresponding to the low latency mode is HWA LL, the coding scheme configuration module sets the Bluetooth audio codec of the audio coding module to HWA LL. In an implementation, when it is detected that an application starts to run (before the source side sends audio data of the application to the playback side), the coding scheme configuration module configures the Bluetooth coding scheme of the audio coding module. Then, when receiving the audio data, the audio coding module on the source side encodes the audio data by using the configured Bluetooth audio codec.

In an implementation, in a process in which the source side sends audio data of an application to the playback side, the coding scheme configuration module may reconfigure the Bluetooth coding scheme of the audio coding module. For example, the source side further includes a detection module, configured to detect a link status between the source side and the playback side (for example, the detection module detects, based on a specified period, a latency of playing audio on the playback side). If a link status change is detected, the coding scheme configuration module may reconfigure the Bluetooth coding scheme of the audio coding module based on the link status.

For example, when the first application is running, the first Bluetooth coding scheme is used to encode the audio data packet that is of the first application and that is sent by the first device to the second device. When a link status change is detected, a fifth Bluetooth coding scheme is used to encode the audio data packet that is of the first application and that is sent by the first device to the second device. The first Bluetooth coding scheme is different from the fifth Bluetooth coding scheme.

For example, if the detection module determines that a playback latency is less than a specified threshold, the coding scheme configuration module reconfigures the Bluetooth coding scheme of the audio coding module from the standard mode to the high sound quality mode. For example, the coding scheme configuration module determines, based on the current application identifier (iQIYI), that the Bluetooth coding scheme of the audio coding module is the standard mode, and the Bluetooth audio codec of the audio coding module is set to SBC. In a process of playing a video, if the detection module detects that a playback latency is less than 30 ms, the coding scheme configuration module reconfigures the Bluetooth coding scheme of the audio coding module to the high sound quality mode.

Further, the audio coding module on the source side notifies the playback side of the Bluetooth coding scheme. For example, the source side sends first indication information to the playback side, and the first indication information is used to indicate a Bluetooth coding scheme corresponding to an audio data packet of an application.

Then, in a process of playing audio data, the audio coding module on the source side encodes a received PCM data packet by using the Bluetooth coding scheme. Correspondingly, an audio decoding unit on the playback side decodes the data packet by using a corresponding decoding scheme. For example, the decoding scheme may include a high sound quality mode, a standard mode, or a low latency mode. For example, a bit rate in the high sound quality mode is greater than 560 kbps, a bit rate in the standard mode is greater than 300 kbps and less than or equal to 560 kbps, and a latency corresponding to the low latency mode is less than 50 ms. The high sound quality mode of the Bluetooth coding scheme corresponds to the high sound quality mode of the decoding scheme, the standard mode of the Bluetooth coding scheme corresponds to the standard mode of the decoding scheme, and the low latency mode of the Bluetooth coding scheme corresponds to the low latency mode of the decoding scheme.

It should be noted that the correspondence between an application and a user scenario, the correspondence between a user scenario and a Bluetooth coding scheme, and the correspondence between an application and a Bluetooth coding scheme shown in this embodiment of this application are merely examples for description. This is not limited in this embodiment of this application. The foregoing correspondence may be adjusted and replaced based on an actual requirement.

Figure 9:
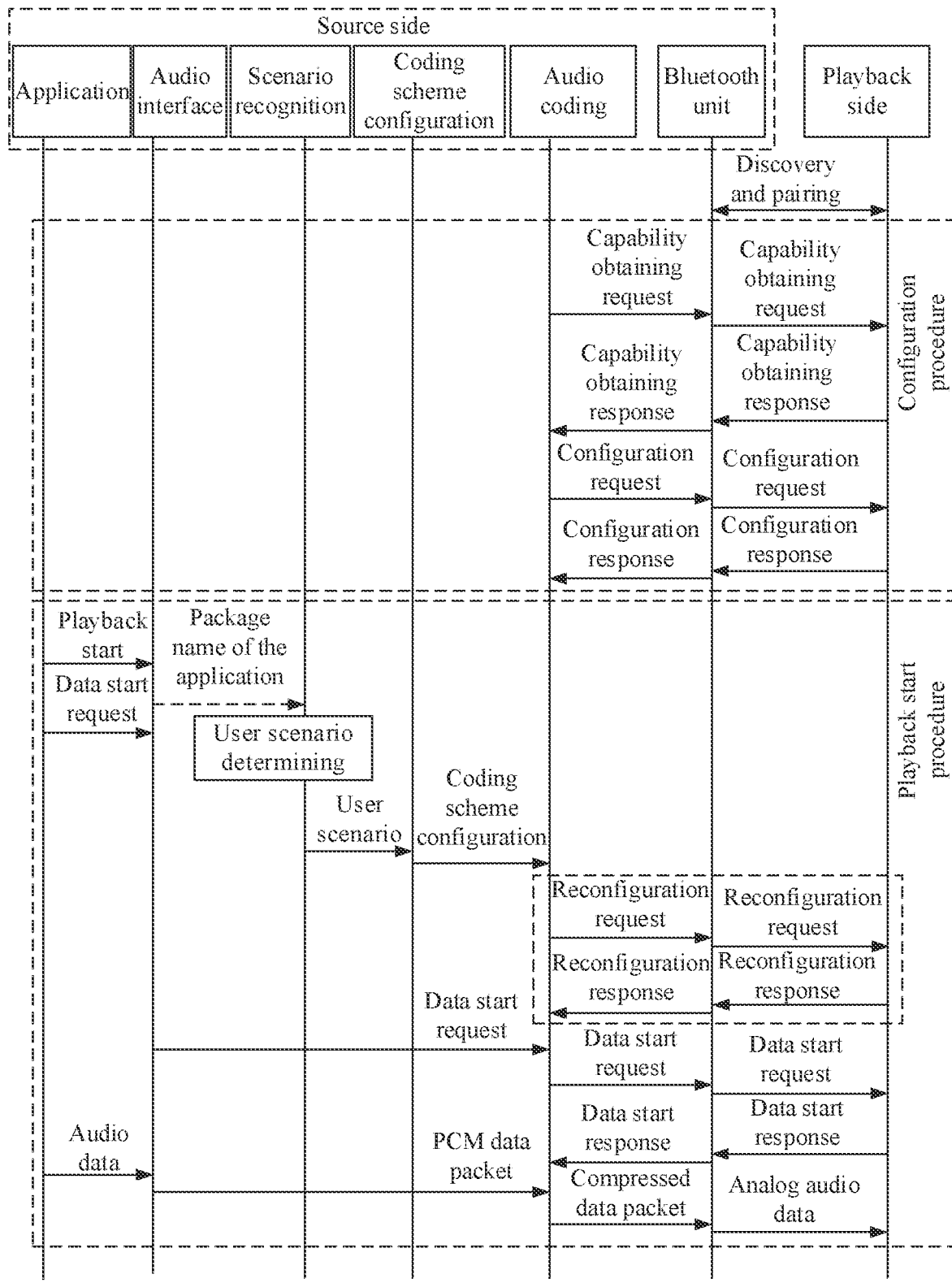
FIG. 9 is a schematic flowchart 2 of a method for automatically switching a Bluetooth audio coding scheme according to an embodiment of this application.

FIG. 9 is a schematic flowchart of a method for automatically switching a Bluetooth audio coding scheme according to an embodiment of this application. As shown in FIG. 9, a source side and a playback side configure parameters according to the configuration procedure in FIG. 7. The source side and the playback side determine same parameters, such as a same Bluetooth audio codec, a same sampling rate, and a same bit width.

In a playback start procedure, a scenario recognition module determines a user scenario based on an application to be started for playback. For example, as shown in FIG. 9, an audio interface module receives a playback start message from an application, and sends a package name of the application included in the playback start message to the scenario recognition module. The scenario recognition module determines a user scenario based on the package name of the application. The scenario recognition module notifies a coding scheme configuration module of the determined user scenario information. The coding scheme configuration module determines a Bluetooth coding scheme of an audio coding module based on the user scenario, and configures the audio coding module to the corresponding Bluetooth coding scheme. Further, the source side notifies the playback side of the configured Bluetooth coding scheme.

In some embodiments, a Bluetooth audio codec corresponding to the Bluetooth coding scheme determined based on the user scenario is the same as a Bluetooth audio codec determined in the configuration procedure. The source side performs encoding by using the Bluetooth audio codec determined in the configuration process, and the playback side performs decoding by using the Bluetooth audio codec determined in the configuration process.

In some embodiments, the Bluetooth audio codec corresponding to the Bluetooth coding scheme determined based on the user scenario is different from the Bluetooth audio codec determined in the configuration procedure. The audio coding module sends a reconfiguration request to the playback side, and the reconfiguration request includes information about the Bluetooth audio codec determined based on the user scenario. The source side performs encoding by using the Bluetooth audio codec in the reconfiguration request, and the playback side performs decoding by using the Bluetooth audio codec in the reconfiguration request.

In some embodiments, a packet header of audio data includes Bluetooth coding scheme information of a Bluetooth audio codec. For example, the Bluetooth coding scheme information is bit rate information of the Bluetooth audio codec. The playback side may determine, based on received audio data, the Bluetooth coding scheme used by the source side. In this way, if the source side performs encoding by using the Bluetooth coding scheme determined based on the user scenario, the playback side performs decoding also by using the Bluetooth coding scheme determined based on the user scenario.

Figure 10:
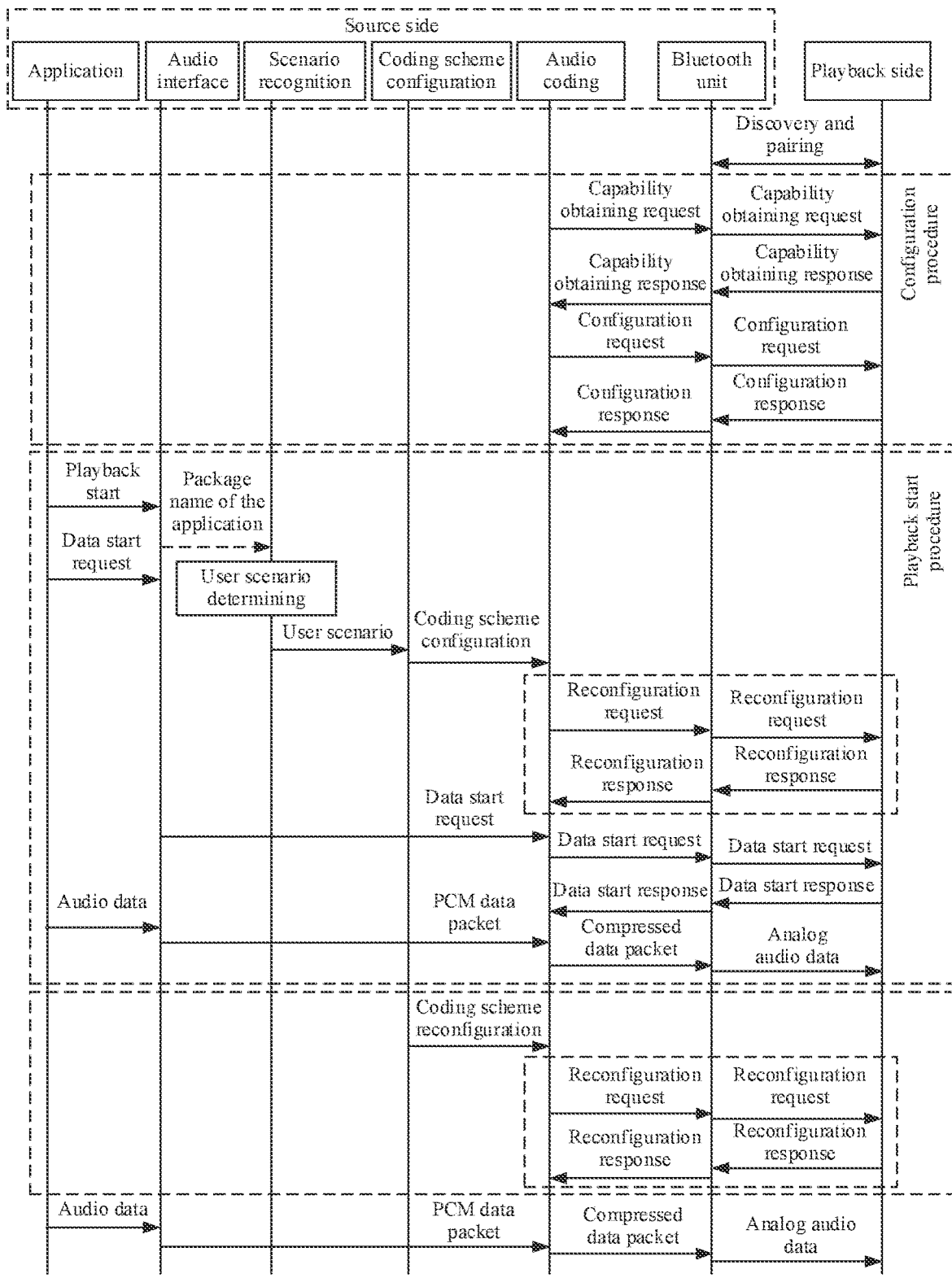
FIG. 10 is a schematic flowchart 3 of a method for automatically switching a Bluetooth audio coding scheme according to an embodiment of this application.

In some embodiments, during audio data playback of the application (for example, when a detection module determines that a playback latency is less than a specified threshold), the coding scheme configuration module may reconfigure the Bluetooth coding scheme of the audio coding module. As shown in FIG. 10, if a Bluetooth audio codec corresponding to the reconfigured Bluetooth coding scheme changes, the audio coding module sends a reconfiguration request to the playback side, and the reconfiguration request includes information about a re-determined Bluetooth audio codec. The source side performs encoding by using the reconfigured Bluetooth audio codec, and the playback side performs decoding by using the reconfigured Bluetooth audio codec.

In some embodiments, the scenario recognition module determines that a current application identifier changes, for example, determines that the "iQIYI" application is quitted and the "Huajiao Live Streaming" application is entered. A user scenario corresponding to the "iQIYI" application is Wi-Fi online video playback, and a corresponding Bluetooth coding scheme of the audio coding module is a standard mode. A user scenario determined by the scenario recognition module based on the current application identifier is Wi-Fi online video playback, and is the same as the user scenario corresponding to the quitted application. The Bluetooth coding scheme of the audio coding module remains unchanged. Correspondingly, a decoding scheme of an audio decoding module on the playback side remains unchanged.

In some embodiments, the scenario recognition module determines that the current application identifier changes, for example, determines that the "iQIYI" application is quitted and the "WeSing" application is entered. The user scenario corresponding to the "iQIYI" application is Wi-Fi online video playback, and the corresponding Bluetooth coding scheme of the audio coding module is the standard mode. The user scenario determined by the scenario recognition module based on the current application identifier is online real-time music interactive entertainment, and is different from the user scenario corresponding to the quitted application. The coding scheme configuration module reconfigures the Bluetooth coding scheme of the audio coding module to the standard mode, which is the same as the Bluetooth coding scheme of the audio coding module corresponding to the quitted application. The Bluetooth coding scheme of the audio coding module remains unchanged. Correspondingly, the decoding scheme of the audio decoding module on the playback side remains unchanged.

In some embodiments, the scenario recognition module determines that the current application identifier changes, for example, determines that a real-time game application is quitted and a music application is entered. A user scenario corresponding to the real-time game application is an online real-time game, and a corresponding Bluetooth coding scheme of the audio coding module is a low latency mode. The user scenario determined by the scenario recognition module based on the current application identifier is online music playback, and is different from the user scenario corresponding to the quitted application. The coding scheme configuration module configures the Bluetooth coding scheme of the audio coding module to the high sound quality mode, which is different from the Bluetooth coding scheme of the audio coding module corresponding to the quitted application. As shown in FIG. 10, if a Bluetooth audio codec corresponding to the reconfigured Bluetooth coding scheme changes, the audio coding module sends a reconfiguration request to the playback side, and the reconfiguration request includes information about a re-determined Bluetooth audio codec. The source side performs encoding by using the reconfigured Bluetooth audio codec, and the playback side performs decoding by using the reconfigured Bluetooth audio codec.

According to the method for automatically switching a Bluetooth audio coding scheme provided in this embodiment of this application, a coding rate used in a process of transmitting Bluetooth audio is determined based on a user scenario. A coding rate of the high sound quality mode is configured in scenarios with a high sound quality requirement, such as music playback. A coding rate of the low latency mode is configured in scenarios with a low latency requirement, such as an online real-time game. This can improve user experience of playing audio by using a Bluetooth device.

For example, the source side is the electronic device 100 in FIG. 2-2, and the playback side is the left earbud 200-1. The electronic device 100 and the left earbud 200-1 configure the Bluetooth audio codec to SBC (the standard mode) according to the configuration procedure in FIG. 7. The electronic device 100 displays an interface shown in FIG. 11, and runs the real-time game "Honor of Kings" in response to an operation of tapping an icon 1001 by the user. The scenario recognition module of the electronic device 100 determines that the current application identifier is "Honor of Kings". Based on Table 4, the coding scheme configuration module determines that the Bluetooth coding scheme of the audio coding module is the low latency mode, and determines to set the Bluetooth audio codec to HWA LL. The coding scheme configuration module indicates the audio coding module to configure the Bluetooth coding scheme, including a Bluetooth audio codec name (HWA LL). The audio coding module sends a reconfiguration request message to the playback side, and the reconfiguration request message includes the Bluetooth audio codec name (HWA LL). The audio coding module receives a reconfiguration response from the playback side.

Then, the audio coding module receives a PCM data packet, and encodes the PCM data packet by using HWA LL. Correspondingly, after receiving audio data from the electronic device 100, the left earbud 200-1 decodes the data packet by using HWA LL. When HWA LL is used for encoding, a latency of playing audio of "Honor of Kings" by the left earbud 200-1 is low, and user experience is good.

Figure 11:
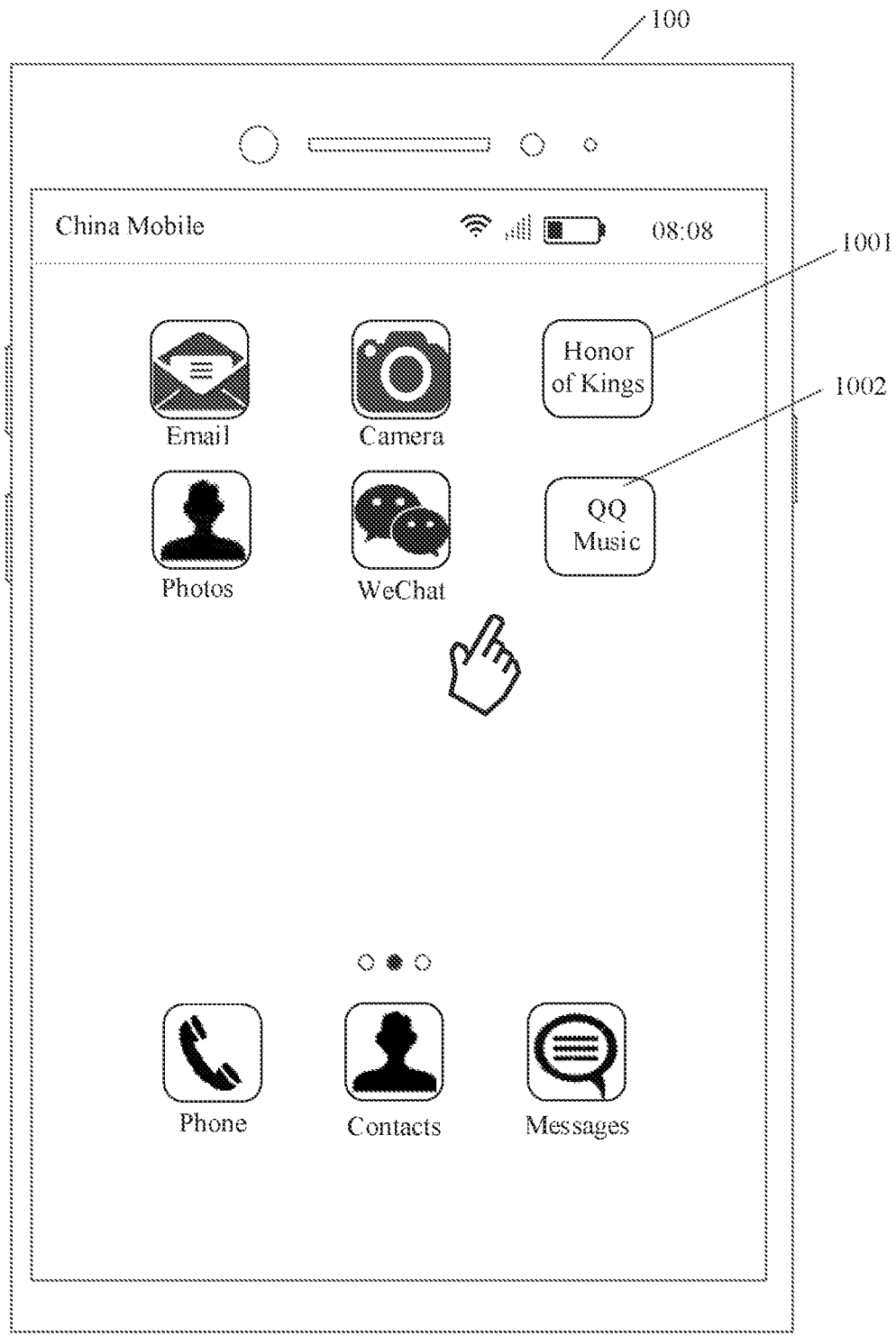
FIG. 11 is a schematic diagram of a terminal display interface to which an embodiment of this application is applicable.

For example, the electronic device 100 displays the interface shown in FIG. 11, and runs "QQ Music" in response to an operation of tapping an icon 1002 by the user. The scenario recognition module of the electronic device 100 determines that the current application identifier is "QQ Music". Based on Table 4, the coding scheme configuration module determines that the Bluetooth coding scheme of the audio coding module is the high sound quality mode, and determines to set the Bluetooth audio codec to HWA. The coding scheme configuration module indicates the audio coding module to configure the Bluetooth coding scheme, including a Bluetooth audio codec name (HWA). The audio coding module sends a reconfiguration request message to the playback side, and the reconfiguration request message includes the Bluetooth audio codec name (HWA). The audio coding module receives a reconfiguration response from the playback side.

Then, the audio coding module receives a PCM data packet, and encodes the PCM data packet by using HWA. Correspondingly, after receiving audio data from the electronic device 100, the left earbud 200-1 decodes the data packet by using HWA. When HWA is used for encoding, sound quality of music audio played by the left earbud 200-1 is high, and user experience is good.

In some embodiments, in a running process of an application, the electronic device on the source side may switch between Bluetooth coding schemes.

In one case, the electronic device on the source side determines, based on different audio types in the application, to use different Bluetooth coding schemes. For example, a real-time game application may include different types of audio such as background audio, voice audio, and system message audio, and the electronic device on the source side determines to use the high sound quality mode to encode the background audio, determines to use the low latency mode to encode the voice audio, and determines to use the standard mode to encode the system message audio.

In one case, the electronic device on the source side determines, based on different data packets in the application, to use different Bluetooth coding schemes for encoding. For example, a currently running application is "WeChat", and an audio data packet of the current application is a music audio data packet. The electronic device on the source side determines to use the high sound quality mode for encoding. In response to a user operation, the audio data packet of the current application is switched to an audio data packet of an online video (for example, a video call), and the electronic device on the source side determines to use the low latency mode for encoding.

It may be understood that, to implement the foregoing functions, the electronic device (for example, the electronic device 100) on the source side includes a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, function module division may be performed on the electronic device based on the foregoing method example. For example, each function module may be obtained through division corresponding to each function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 12:
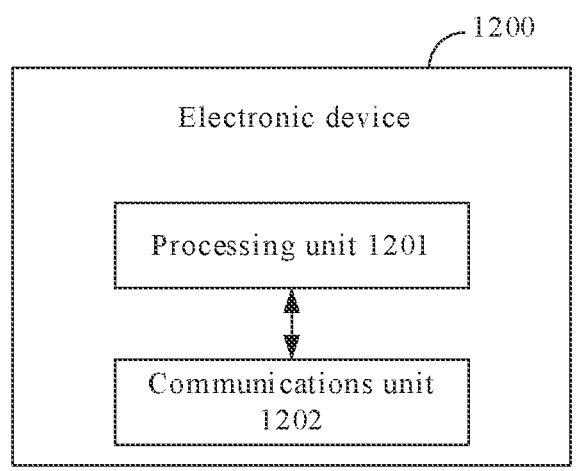
FIG. 12 is a schematic structural diagram of an electronic device according to an embodiment of this application.

When an integrated unit is used, FIG. 12 is a possible schematic structural diagram of the electronic device on the source side in the foregoing embodiment. The electronic device 1200 includes a processing unit 1201 and a communications unit 1202.

The processing unit 1201 is configured to control and manage an action of the electronic device 1200. For example, the processing unit 1201 may be configured to perform processing steps related to the scenario recognition module and the coding scheme configuration module in the foregoing embodiment, and/or processing steps related to the audio coding module, and/or another process of the technology described in this specification.

The communications unit 1202 is configured to support communication between the electronic device 1200 and another network entity. For example, the communications unit 1202 may be configured to perform a related step of sending a Bluetooth audio data packet from the source side to the playback side in the foregoing embodiment, and/or a related step of performing message exchange between the source side and the playback side, and/or another process of the technology described in this specification.

Certainly, units and modules in the electronic device 1200 include but are not limited to the processing unit 1201 and the communications unit 1202. For example, the electronic device 1200 may further include a storage unit. The storage unit is configured to store program code and data of the electronic device 1200.

The processing unit 1201 may be a processor or a controller, for example, may be a central processing unit (central processing unit, CPU), a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may include an application processor and a baseband processor. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications unit 1202 may be a transceiver, a transceiver circuit, or the like. The storage unit may be a memory.

For example, the processing unit 1201 is a processor (the processor 110 shown in FIG. 3), and the communications unit 1202 includes a mobile communication module (the mobile communication module 150 shown in FIG. 3) and a wireless communication module (the wireless communication module 160 shown in FIG. 3). The mobile communication module and the wireless communication module may be collectively referred to as a communications interface. The storage unit may be a memory (the internal memory 121 shown in FIG. 3). The electronic device 1200 provided in this embodiment of this application may be the electronic device 100 shown in FIG. 3. The processor, the memory, the communications interface, and the like may be connected together, for example, by using a bus.

An embodiment of this application further provides a computer storage medium. The computer storage medium stores computer program code. When the processor executes the computer program code, the electronic device performs the method in the foregoing embodiment.

An embodiment of this application further provides a computer program product. When the computer program product runs on a computer, the computer performs the method in the foregoing embodiment.

The electronic device 1200, the computer storage medium, and the computer program product provided in the embodiments of this application are all configured to perform the corresponding method provided above. Therefore, for beneficial effects that can be achieved by the electronic device 1200, the computer storage medium, and the computer program product, refer to beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for automatically switching a BLUETOOTH audio coding scheme and implemented by a first device, the method comprising:
   using, when a first application of the first device is running, a first BLUETOOTH coding scheme to encode a first audio data packet for sending by the first device to a second device, wherein the first audio data packet is an audio data packet of the first application;
   using, when a second application of the first device is running, a second BLUETOOTH coding scheme that is different than the first BLUETOOTH coding scheme to encode a second audio data packet for sending by the first device to the second device, wherein the second audio data packet is an audio data packet of the second application; and
   using, when a link status changes, a fifth BLUETOOTH coding scheme to encode the first audio data packet, wherein the fifth BLUETOOTH coding scheme is different from the first BLUETOOTH coding scheme.

2. The method of claim 1, wherein:
   the first BLUETOOTH coding scheme comprises a high sound quality mode, a standard mode, or a low latency mode;
   the high sound quality mode comprises at least one of LDAC, aptX high definition (aptX HD), or HiRes wireless audio (HWA);
   the standard mode comprises at least one of sub-band coding (SBC), advanced audio coding (AAC), or aptX; and
   the low latency mode comprises at least one of HWA low latency (LL) or aptX LL.

3. The method of claim 1, wherein:
   the first BLUETOOTH coding scheme and the second BLUETOOTH coding scheme respectively correspond to different bit rate modes of a BLUETOOTH audio codec; and
   the BLUETOOTH audio codec is one of LDAC, aptX high definition (aptX HD), HiRes wireless audio (HWA), sub-band coding (SBC), advanced audio coding (AAC), aptX, HWA low latency (LL), or aptX LL.

4. The method of claim 2, wherein the method further comprises:
   encoding the first audio data packet using the first BLUETOOTH coding scheme when the first application belongs to a first application category; and
   encoding the second audio data packet using the second BLUETOOTH coding scheme when the second application belongs to a second_application category,
   wherein the first application category is different than the second application category.

5. The method of claim 4, wherein the first application category comprises music playback, a video, a real-time game, music interaction, or a call.

6. The method of claim 5, further comprising:
   encoding the first audio packet in the high sound quality mode when on the first application corresponds to music playback; and encoding the second audio data packet in the low latency mode when on the second application corresponds to a real-time game.

7. The method of claim 5, wherein a third application belongs to a third application category, and wherein the method further comprises:
encoding a third audio packet of the third application using a third BLUETOOTH coding scheme when the third application is in a first network state; and
encoding the third audio packet of using a fourth BLUETOOTH coding scheme when the third application is in a second network state,
wherein the first network state comprises a Wi-Fi state, a cellular state, or a local state,
wherein the first network state is different than the second network state, and
wherein the third BLUETOOTH coding scheme is different than the fourth BLUETOOTH coding scheme.

8. The method of claim 7, wherein the third application belongs to a video application, and wherein the method further comprises:
encoding the third audio data packet in the standard mode when the third application is in the Wi-Fi state; and
encoding the third audio data packet in the high sound quality mode when the third application is in the local state.

9. The method of claim 1, further comprising:
using, when the first application is running, a standard mode to encode the first audio data packet;
detecting that a latency of playing audio data of the first application is less than a specified threshold; and
using, in response to detecting that the latency is less than the specified threshold, a high sound quality mode to encode the first audio data packet.

10. The method of claim 1, further comprising sending first indication information to the second device, wherein the first indication information indicates a BLUETOOTH coding scheme corresponding to an audio data packet of an application.

11. A first electronic device, comprising:
a memory configured to store computer program code; and
a processor coupled to the memory and configured to execute the computer program code to cause the first electronic device to:
use, when a first application of the first electronic device is running, a first BLUETOOTH coding scheme to encode a first audio data packet for sending by the first electronic device to a second device, wherein the first audio data packet is an audio data packet of the first application;
use, when a second application of the first electronic device is running, a second BLUETOOTH coding scheme that is different than the first BLUETOOTH coding scheme to encode a second audio data packet for sending by the first electronic device to the second device, wherein the second audio data packet is an audio data packet of the second application; and
use, when a link status changes, a fifth BLUETOOTH coding scheme to encode the first audio data packet, wherein the fifth BLUETOOTH coding scheme is different from the first BLUETOOTH coding scheme.

12. The first electronic device of claim 11, wherein:
the first BLUETOOTH coding scheme comprises a high sound quality mode, a standard mode, or a low latency mode;
the high sound quality mode comprises at least one of LDAC, aptX high definition (aptX HD), and HiRes wireless audio (HWA);
the standard mode comprises at least one of sub-band coding (SBC), advanced audio coding (AAC), and aptX; and
the low latency mode comprises at least one of HWA low latency (LL) and aptX LL.

13. The first electronic device of claim 11, wherein:
the first BLUETOOTH coding scheme and the second BLUETOOTH coding scheme respectively correspond to different bit rate modes of a BLUETOOTH audio codec; and
the BLUETOOTH audio codec is one of LDAC, aptX high definition (aptX HD), HWA, sub-band coding (SBC), advanced audio coding (AAC), aptX, HWA low latency (LL), and aptX LL.

14. The first electronic device of claim 12, wherein the processor is further configured to cause the first electronic device to:
encode the first audio data packet using the first BLUETOOTH coding scheme when the first application belongs to a first application category; and
encode the second audio data packet using the second BLUETOOTH coding scheme when the second application belongs to a second application category,
wherein the first application category is different than the second application category.

15. The first electronic device of claim 14, wherein the application category comprises music playback, a video, a real-time game, music interaction, or a call.

16. The first electronic device of claim 15, wherein the processor is further configured to cause the first electronic device to:
encode the first audio packet in the high sound quality mode when the first application corresponds to music playback;
determine that the second application corresponds to the real time game; and
encode the second audio data packet in the low latency mode when the second application corresponds to a real-time game.

17. The first electronic device of claim 15, wherein a third application corresponds to a third application category, and wherein the processor is further configured to cause the first electronic device to:
encode a third audio packet of the third application using a third BLUETOOTH coding scheme when the third application is in a first network state; and
encoding the third audio packet of using a fourth BLUETOOTH coding scheme when the third application is in a second network state,
wherein the first network state comprises a Wi-Fi state, a cellular state, or a local state, wherein the first network state is different than the second network state, and wherein the third BLUETOOTH coding scheme is different than the fourth BLUETOOTH coding scheme.

18. The first electronic device of claim 17, wherein the third application corresponds to a video application, and wherein the processor is further configured to cause the first electronic device to:
encode the third audio data packet in the standard mode when the third application is in the Wi-Fi state; and
encode the third audio data packet in the high sound quality mode when the third application is in the local state.

19. The first electronic device of claim 11, wherein the processor is further configured to cause the first electronic device to:
- use, when the first application is running, a standard mode to encode the first audio data packet;
- detect that a latency of playing audio data of the first application is less than a specified threshold; and
- use, in response to detecting that the latency is less than the specified threshold, a high sound quality mode to encode the first audio data packet.

20. The first electronic device of claim 11, wherein the processor is further configured to cause the first electronic device to send first indication information to the second device, wherein the first indication information indicates a BLUETOOTH coding scheme corresponding to an audio data packet of an application.

* * * * *

UNITED STATES PATENT AND TRADEMARK OFFICE
CERTIFICATE OF CORRECTION

Page 1 of 1

PATENT NO. : 12,148,439 B2
APPLICATION NO. : 17/418569
DATED : November 19, 2024
INVENTOR(S) : Liang Wang It is certified that error appears in the above-identified patent and that said Letters Patent is hereby corrected as shown below:

On the Title Page

Item (57) Abstract should read: "A method for automatically switching a Bluetooth audio coding scheme and an electronic device includes when a first device sends a Bluetooth audio data packet to a second device, and when a first application is running, the audio data packet sent by the first device to the second device is encoded using a first Bluetooth coding scheme. When a second application is running, the audio data packet sent by the first device to the second device is encoded using a second Bluetooth coding scheme. The Bluetooth coding scheme includes a high sound quality mode, a standard mode, or a low latency mode. The first Bluetooth coding scheme is different than the second Bluetooth coding scheme."

In the Claims

Claim 4, Column 34, Line 58: "to a second_application category," should read "to a second application category,"

Claim 16, Column 36, Lines 38-40: "playback; determine that the second application corresponds to the real time game; and" should read "playback; and"

Signed and Sealed this
Eighteenth Day of March, 2025

Coke Morgan Stewart
*Acting Director of the United States Patent and Trademark Office*